(12) United States Patent
Kuzunuki et al.

(10) Patent No.: US 7,299,186 B2
(45) Date of Patent: Nov. 20, 2007

(54) SPEECH INPUT SYSTEM, SPEECH PORTAL SERVER, AND SPEECH INPUT TERMINAL

(75) Inventors: Soshiro Kuzunuki, Hitachinaka (JP); Shinya Ohtsuji, Tokai (JP); Michio Morioka, Hitachi (JP); Tadashi Kamiwaki, Tokai (JP); Mariko Okude, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/060,390

(22) Filed: Feb. 17, 2005

(65) Prior Publication Data

US 2005/0149332 A1 Jul. 7, 2005

Related U.S. Application Data

(63) Continuation of application No. 10/192,317, filed on Jul. 11, 2002, now Pat. No. 6,944,593, which is a continuation of application No. 10/083,636, filed on Feb. 27, 2002, now abandoned.

(30) Foreign Application Priority Data

Oct. 2, 2001 (JP) .............................. 2001-306787

(51) Int. Cl.
*G10L 21/00* (2006.01)
(52) U.S. Cl. .................................. 704/270.1
(58) Field of Classification Search ...................... None
See application file for complete search history.

(56) References Cited

U.S. PATENT DOCUMENTS 5,799,279 A * 8/1998 Gould et al. ................ 704/275

(Continued)

FOREIGN PATENT DOCUMENTS

EP 0344 017 * 11/1989

(Continued)

OTHER PUBLICATIONS

U.S. Appl. No. 09/493,134, filed Jan. 28, 2000, Okude et al.

(Continued)

*Primary Examiner*—Abul K. Azad
(74) *Attorney, Agent, or Firm*—Crowell & Moring LLP

(57) ABSTRACT

In order to provide a speech input system for having access from a mobile terminal such as a PDA or a portable phone, or a stationary terminal such as a home telephone, a TV set, or a PC to a network through speech, and receiving a service from a provider for providing map information, music information, broadcast program information, and telephone information, the speech input system comprises speech input terminals 10, 30 provided with a speech input/output mean, and an access status display mean, a speech portal server 50 provided with a speech recognizing mean for receiving a speech to recognize it as a text, a command converting mean for checking the recognized text with a command text dictionary, and separating it into a command text and an object text, and a conversation control mean for having an access to, and receiving a service from a provider which provides different information based on the separated texts, and providing the speech input terminal with the service, and a provider 60 for searching information based on the command text and the object text received from the speech portal server, and serves the speech portal server with a search result.

5 Claims, 19 Drawing Sheets

U.S. PATENT DOCUMENTS

| | | | |
|---|---|---|---|
| 5,899,972 A * | 5/1999 | Miyazawa et al. | 704/249 |
| 6,044,347 A * | 3/2000 | Abella et al. | 704/272 |
| 6,097,841 A | 8/2000 | Gunji et al. | |
| 6,327,566 B1 * | 12/2001 | Vanbuskirk et al. | 704/257 |
| 6,338,082 B1 * | 1/2002 | Schneider | 709/203 |
| 6,356,868 B1 * | 3/2002 | Yuschik et al. | 704/246 |
| 6,434,529 B1 * | 8/2002 | Walker et al. | 704/275 |
| 6,910,003 B1 * | 6/2005 | Arnold et al. | 704/4 |
| 6,922,670 B2 * | 7/2005 | Yamada et al. | 704/270.1 |
| 6,944,593 B2 * | 9/2005 | Kuzunuki et al. | 704/270.1 |
| 2001/0013001 A1 | 8/2001 | Brown et al. | |
| 2005/0015519 A1 * | 1/2005 | Hodjat et al. | 710/15 |

FOREIGN PATENT DOCUMENTS

| | | |
|---|---|---|
| JP | 1994133039 | 5/1994 |
| JP | 1995212478 | 8/1995 |
| JP | 1996248987 | 9/1996 |
| JP | 11-143493 | 5/1999 |
| JP | 2000-057490 | 2/2000 |
| JP | 2000137596 | 5/2000 |
| JP | 2000-224338 | 8/2000 |
| JP | 2000259183 | 9/2000 |
| JP | 2001-034292 | 2/2001 |
| WO | WO 00/21232 A2 | 4/2000 |

OTHER PUBLICATIONS

U.S. Appl. No. 09/518,908, filed Mar. 3, 2000, Machi et al.

Joakim Gustafson, et al., "An Educational Dialogue System with a User Controllable Dialogue Manager", Proceedings of 1998 International Conference on Spoken Language Processing, (Oct. 1998), pp. 504-507.

Hiroshi Kanazawa, et al., "A Hybrid Wordspotting Method For Spontaneous Speech Understanding Using Word-Based Pattern Matching and Phoneme-Based HMM", Acoustics, Speech and Signal Processing, (May 9, 1995), pp. 289-292.

European Search Report dated Apr. 7, 2006 (Three (3) pages).

* cited by examiner

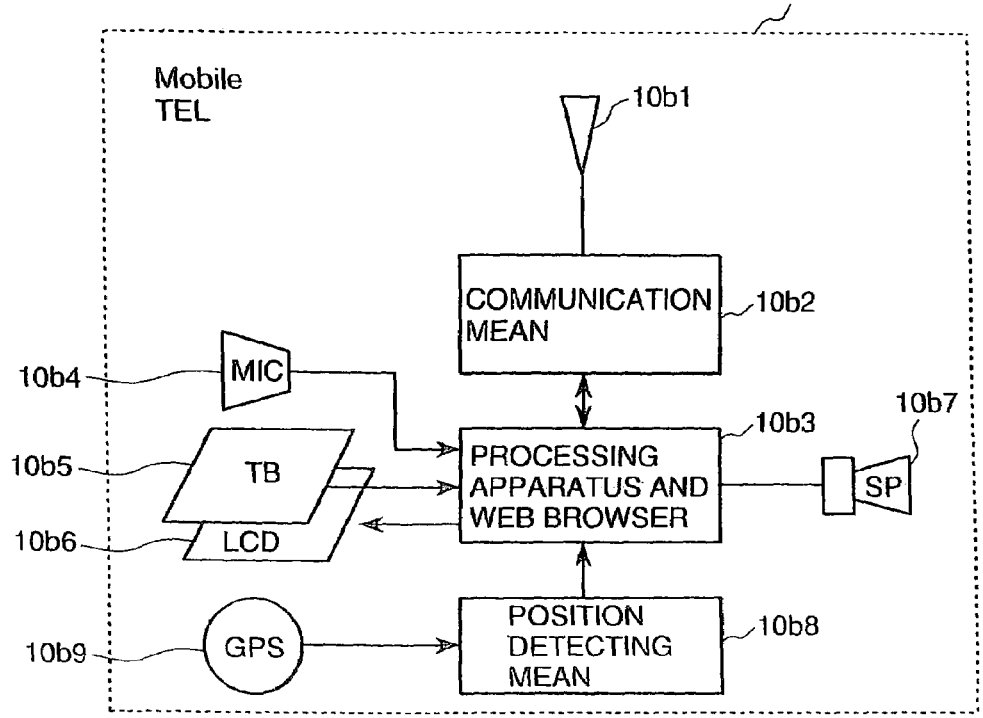
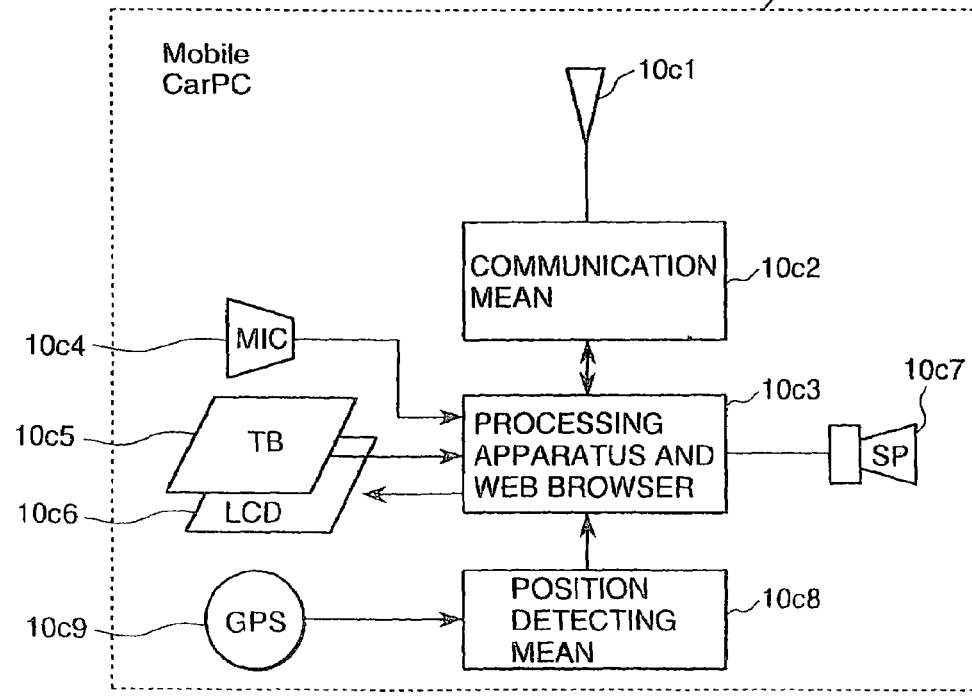

FIG. 15

| NO | COMMAND ID | COMMAND NAME 1 | COMMAND NAME 2 | COMMAND NAME 3 | COMMAND NAME 4 | COMMAND NAME 5 |
|---|---|---|---|---|---|---|
| 1 | D01 | MOKUTEKITI SETTEI | MOKUTEKITI WO KENNSAKU SURU | IKISAKI WO SETTEISURU | IKITAI | IKU |
| 2 | D02 | MOKUTEKITI KENSAKU | MOKUTEKICHI WO SAGASHITE | MOKUTEKICHI WO SAGASE | | |
| 3 | D03 | KEIYUCHI SETTEI GENZAI | KEIYUCHI SETTEI SURU | YORITAI | KEIYUSHITAI | YORIMICHISHITAI |
| 4 | D04 | CHI HYOUJI | GENZAICHI WO OSHIETE | GENNZAICHI HA DOKO | | |
| 5 | M01 | ONGAKU KENSAKU | KYOKU WO KAKETAI | KYOKU WO KIKITAI | KYOKU WO SAGASHITE | KYOKU WO SAGASE |
| 6 | T01 | BANGUMI KENSAKU | BANGUMI WO MITAI | BANNGUMI WO SAGASHITE | BANNGUMI WO SAGASE | |
| 7 | T02 | BANGUMI YOYAKU | BANGUMI WO YOYAKU | | | |
| 8 | P01 | DENWA KENSAKU | DENWA WO KAKETE | DENNWA WO SHITAI | DENNWA WO SHITE | |
| 9 | YES | HAI | SOUDESU | YES | | |
| 10 | NO | IIE | CHIGAIMASU | NO | | |
| 11 | SU | UE NI SUKUROULE | UE NI IDOU | | | |
| 12 | SD | SHITA NI SUKUROULE | SHITA NI IDOU | | | |
| 13 | SR | MIGI NI SUKUROULE | MIGI NI IDOU | | | |
| 14 | SL | HIDARI NI SUKUROULE | HIDARI NI IDOU | | | |
| 15 | STOP | STOP | TEISHI | | | |
| 16 | BACK | MAE HE | MAE NI | | | |
| 17 | NEXT | TUGI HE | TUGI NI | | | |
| 18 | NO1 | 1BAN | 1BANME | | | |
| 19 | NO2 | 2BAN | 2BANME | | | |
| 20 | NO3 | 3BAN | 3BANME | | | |
| 21 | NO4 | 4BAN | 4BANME | | | |
| 22 | NO5 | 5BAN | 5BANME | | | |

SPEECH INPUT SYSTEM, SPEECH PORTAL SERVER, AND SPEECH INPUT TERMINAL

CROSS-REFERENCE TO RELATED APPLICATIONS

This application is a continuation of U.S. application Ser. No. 10/192,317 filed on Jul. 11, 2002 now U.S. Pat. No. 6,944,593 which is a continuation of Ser. No. 10/083,636 filed Feb. 27, 2002 now abandoned.

DETAILED DESCRIPTION OF THE INVENTION

The present invention relates to a speech input system, a speech portal server, and a speech input terminal, and more specifically to a speech input system which have an access from a mobile terminal device such as a portable phone, and an onboard navigation system, and a home (stationary) terminal such as a home telephone, a TV set, or a PC to an network with a speech, and receive information and services from an information service provider which provides map information, music information, TV broadcast program information, and telephone information.

Japanese application patent laid-open publication No. Hei 11-143493 describes a system which converts a provided speech into an intermediate language, which is a database language, with a speech language understanding device, and searches a word.

Japanese application patent laid-open publication No. 2000-57490 describes a method for increasing a recognition capability for a provided speech while switching recognition dictionaries.

Japanese application patent laid-open publication No. 2001-34292 describes a method for increasing a recognition capability where a word from a dictionary is extracted with a word spotting technique, a requested key word is recognized to determine a topic, and a speech is recognized with a recognition dictionary specific to the topic.

The technique in Japanese application patent laid-open publication No. Hei 11-143493 is a method to learn a hidden Markov model which converts a sentence data into a corresponding intermediate language such that a recognition error becomes minimum. Since this method is a learning based on statistic processing, learning in individual fields is required when service is provided for different fields simultaneously, the processing takes a long time, and the recognition capability decreases. This is not designed as a speech input system considering an actual conversation which includes mixed long sentences and short sentences. Further, no attention is paid for a case where there is an error in a part of recognized string.

The technique in Japanese application patent laid-open publication No. 2000-57490 is an invention for a navigation system for increasing a recognition capability while switching corresponding dictionaries according to a recognized result, and speech cannot be provided consecutively. No attention is paid for a case where there is an error in a part of recognized string.

The technique in Japanese application patent laid-open publication No. 2001-34292 is an invention for increasing recognition capability while extracting a topic according to a recognized result, and switching dictionaries. No attention is paid for a case where there is an error in a part of recognized string as the two prior inventions described above.

SUMMARY OF THE INVENTION

The purpose of the present invention is to provide a speech input system, a speech portal server and a speech input system which have access from a mobile terminal such as a PDA and a portable phone, and stationary terminal such as a home telephone (Home TEL), a TV set and a PC to a network with speech, and receives services from a provider for providing map information, music information, broadcast program information and telephone information.

The present invention proposes a speech input system comprising a speech input terminal provided with a speech input/output mean, a Web browser, and a display mean for displaying an access status to an external system and a search result, a speech portal server provided with a speech recognizing mean for receiving a speech from the speech input terminal to recognize it as a text, a command converting mean for checking the recognized text with a command text dictionary, and separating it into a command text and an object text, and a conversation control mean for having an access to, and receiving a service from an application service provider which provides different information based on the separated command text and object text, and providing the speech input terminal with the service, and an application service provider which is provided with an information search mean for searching information based on the command text and the object text received from the speech portal server, and serves the speech portal server with a search result.

The information search mean of the application service provider can extract every (n) characters from the received object text, and search for information based on an n-character INDEX created beforehand.

The application service provider includes a navigation information application service provider for serving map information, a music information application service provider for serving music information, a broadcast program information application service provider for serving at least one type of information of TV broadcast program information, CS broadcast program information, and CATV broadcast program information, and a telephone information application service provider for serving telephone information.

The speech portal server recognizes a speech received by the speech input terminal, and separates it into a command text and an object text, conducts a fuzzy search for information stored in the application service provider based on the separated texts, and provides the speech input terminal with intended information even if there is a partial recognition error in the object text in the present invention.

The present invention propose a speech input system comprising a speech input terminal provided with a speech input/output mean, and a mean for displaying an access status to an external system, an application service provider for providing different information, and a speech portal server which controls a conversation between the speech input terminal and the application service provider based on the provided speech, and is provided with a speech recognizing mean for receiving a speech from the speech input terminal to recognize it as a text, a command converting mean for checking the recognized text with a command text dictionary, and separating it into a command text and an object text, and a conversation control mean for sending the separated command text and the object text to the application service provider, and providing the speech input terminal with information searched by said application service provider.

The speech recognizing mean is provided with a connected speech recognizing mean, a word speech recognizing mean, and a comprehensive recognition evaluating mean for selecting either of recognition results of said two recognizing means with a speech characteristic value provided as a threshold.

The speech characteristic value is a speech time or a recognized string length.

Since a speech recognizing engine in the speech portal server comprises a connected speech recognizing engine suitable for a long sentence, and a word speech recognizing engine suitable for a short sentence such as a command for comprehensive evaluation, thereby increasing recognition capability of speech conversation.

A speech input terminal which has access to the speech portal server and the application service provider for providing different information is provided with a speech input/output mean, a Web browser, and a display mean for displaying an access status to an external system and a search result in the present invention.

The speech input terminals are classified into portable speech input terminals which are integrated into any one of a PDA, a portable phone, or an onboard navigation system, and home speech input terminals which are integrated into any one of a home telephone, a TV set and a PC.

Since the navigation information ASP, the music information ASP, the broadcast program information ASP, and the telephone information ASP are provided as application service providers (ASP's), the mobile speech input terminals such as a PDA, a Mobile TEL, and a Mobile Car PC and the home speech input terminals such as a home telephone, a TV set, and a PC are served with optimal information

BRIEF DESCRIPTION OF THE DRAWINGS

FIG. 3 is a block diagram for showing an embodiment of a Mobile TEL serving as a speech input terminal of the present invention.

FIG. 4 is a block diagram for showing an embodiment of a Mobile Car PC serving as a speech input terminal of the present invention.

FIG. 15 is a drawing for showing an example of a speech command text dictionary of the present invention.

DETAILED DESCRIPTION OF THE PREFERRED EMBODIMENTS

The following section describes embodiments of a speech input system, a speech portal server, and a speech input terminal while referring to FIG. 1 to FIG. 28.

Figure 1:
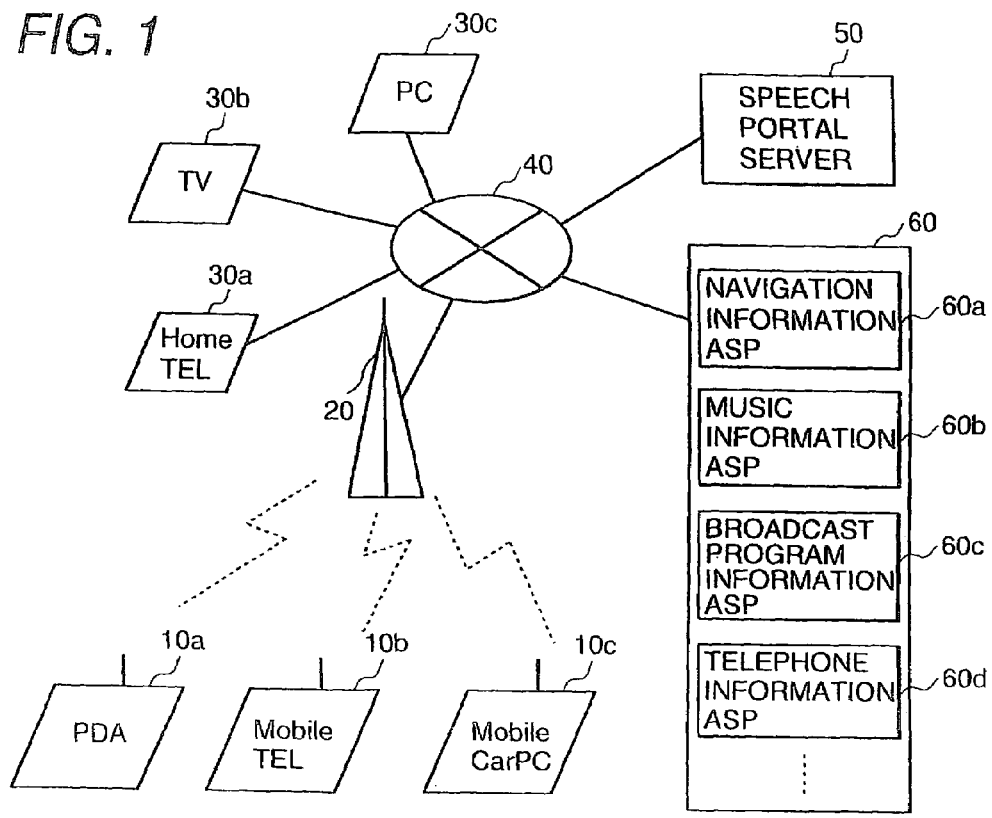
FIG. 1 is a block diagram showing an overall constitution of an embodiment of a speech input system of the present invention.

FIG. 1 is a block diagram showing an overall constitution of an embodiment of a speech input system of the present invention.

A mobile terminal 10 and a home (stationary) terminal 30 are available as a speech input terminal device in the present embodiment. The mobile terminal 10 includes a PDA 10a, a cellular phone 10b, and an onboard terminal 10c. The home (stationary) terminal 30 includes a stationary telephone 30a which is intended for a household application, a television system TV 30b as an information home electric appliance, and a personal computer PC 30c. The portable terminals 10a to 10c are connected with an Internet network 40 through a radio base station 20, and the home terminals 30a to 30c are directly connected with the Internet network 40.

The speech portal 50 for controlling the entire speech conversation, and different application service providers (ASP's) 60 are connected with the Internet network 40 as well.

The ASP includes a navigation information ASP 60a for serving map information, a music information ASP 60b, a TV broadcast program information ASP 60c, and a telephone information ASP 60d.

When any one of the speech input terminals 10a to 10c, and 30a to 30c connects with a speech portal server 50, a speech guidance and a menu display are provided on the speech input terminal, and entering a corresponding speech transmits the speech to the speech portal server 50 through the Internet network 40.

The speech portal server 50 recognizes the speech, applies the command conversion to the content of the speech for converting it into a command and an object to be searched for, and transmits them to an ASP 60 corresponding to the content of the command.

The ASP 60 searches a corresponding database, and provides the speech input terminal where the speech is entered with a search result through the speech portal server 50.

As describe above, the speech input system is mainly used for a potable terminal under an environment where a keyboard (KB) is hardly available, and a household where keyboard operation is not popular, thereby facilitating the input.

A group of servers are connected with the Internet as an overall constitution of the speech input system in the present embodiment.

When the group of servers are connected with an intranet or a home network, their effect does not make a difference in these networks. It is possible that different types of ASP group are provided closely, and the ASP group serves as a cache server which is connected with the Internet server group only when the ASP group cannot provide an intended service.

Information services other than those shown in FIG. 1 such as stock price information, trading partner information, customer information and product information may exist in the ASP server group.

The speech portal server 50 may manage personal information, and provide services according to personal characteristics.

Figure 2:
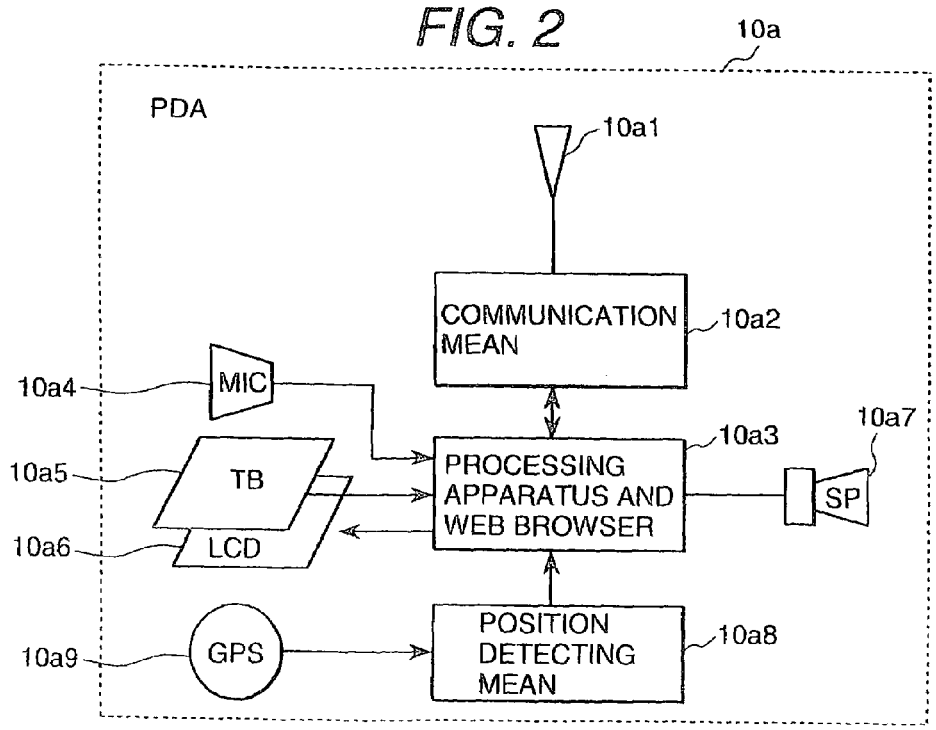
FIG. 2 is a block diagram for showing an embodiment of a PDA serving as a speech input terminal of the present invention.
Figure 5:
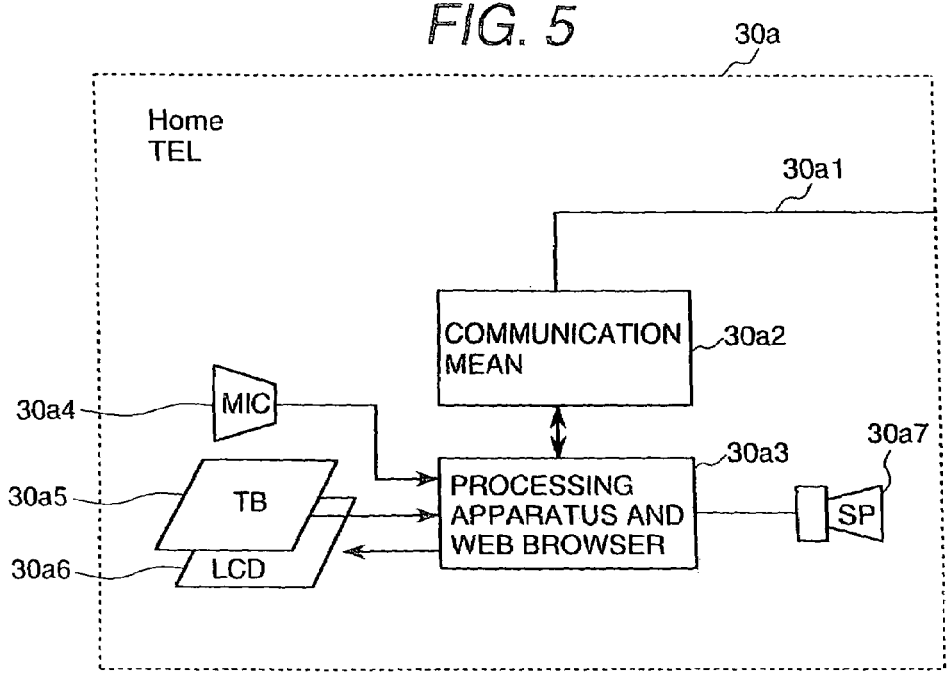
FIG. 5 is a block diagram for showing an embodiment of a home telephone serving as a speech input terminal of the present invention.
Figure 6:
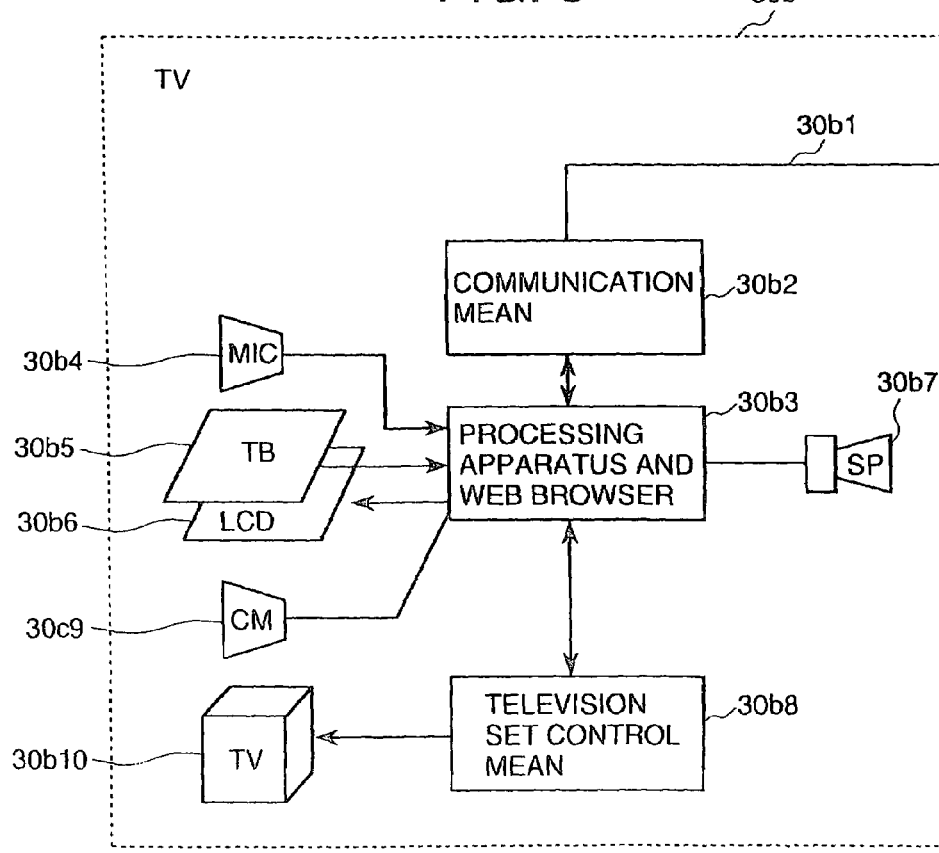
FIG. 6 is a block diagram for showing an embodiment of a TV set serving as a speech input terminal of the present invention.
Figure 7:
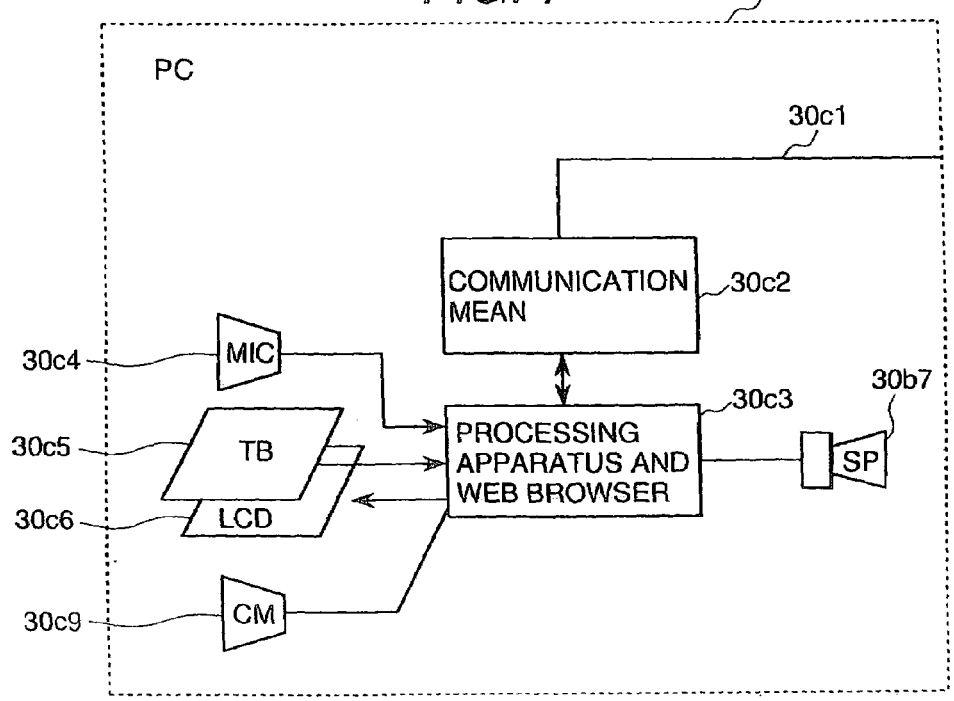
FIG. 7 is a block diagram for showing an embodiment of a PC serving as a speech input terminal of the present invention.

FIG. 2 to FIG. 4 show constitutions of mobile terminals, and FIG. 5 to FIG. 7 show constitutions of home (stationary) terminals. A primary part of the individual terminals is constituted almost in the same way.

FIG. 2 is a block diagram for showing an embodiment of a PDA serving as a speech input terminal of the present invention. The PDA 10a includes an antenna for communicating with the radio base station 20, and a communication mean 10a2 for the radio communication. The communication mean 10a2 can transmit and receive speeches and data simultaneously with a Voice Over IP (VoIP) technology or the like. A processing apparatus and a Web browser 10a3 are connected with individual constituting parts and peripherals, and control the entire terminal. The peripherals include a microphone MIC 10a4 for speech input, a coordinate input apparatus (tablet) TB 10a5 constituted as a touch panel, a liquid crystal display LCD 10a6, and a speaker SP 10a7.

The PDA 10a is provided with a position detecting mean 10a8 important for a mobile terminal, and is connected with the GPS (Global Positioning System) 10a9.

The touch panel and a speech can be used for the operation of the PDA 10a. The processed result is shown on the display, and the PDA 10a enters a state ready for the next operation.

FIG. 3 is a block diagram for showing a constitution of a Mobile TEL serving as a speech input terminal of the present invention. The constituting elements are the same as those for the PDA 10a in FIG. 2. The size and the color display capability of a liquid crystal display LCD 10b are generally different for reducing its cost. On the other hand, different types of software for a mobile telephone is added.

FIG. 4 is a block diagram for showing a constitution of a Mobile Car PC serving as a speech input terminal of the present invention. The constituting elements are basically the same as those for the PDA 10a in FIG. 2. A liquid crystal display LCD 10c6 suitable for installing on a vehicle and onboard application software are different from the PDA 10a in FIG. 2. The Mobile Car PC is connected with different onboard sensors, which are not shown in the figure, and may show information on a vehicle.

FIG. 5 is a block diagram for showing a constitution of a home telephone serving as a speech input terminal of the present invention. The difference from the PDA 10a shown in FIG. 2 is that it does not have the antenna 10a1 for communicating with the radio base station 20, the position detecting mean 10a8, and the GPS 10a9.

FIG. 6 is a block diagram for showing a constitution of a TV set serving as a speech input terminal of the present invention. The difference from the stationary home telephone 30a in FIG. 5 includes a television apparatus TV 30b10, a TV set control mean 30b8, and a camera CM 30c9. The TV control mean 30b8 is a mean for programming for recoding a TV broadcast program, and setting a channel, and is generally referred as a set top box.

The camera CM 30c9 is used for transmitting an image for conversation to the other party, and monitoring a room with an image.

FIG. 7 is a block diagram for showing a constitution of a PC serving as a speech input terminal of the present invention. The difference from the stationary home telephone 30a in FIG. 5 is that there is no TV set control mean. The operation for the PC is conducted through a touch panel or a speech. A keyboard suppressed from the drawing may be connected for operating the PC.

The camera CM 30c9 shown in FIG. 6 and FIG. 7 may be installed on the speech input terminal in FIG. 2 to FIG. 5.

Figure 8:
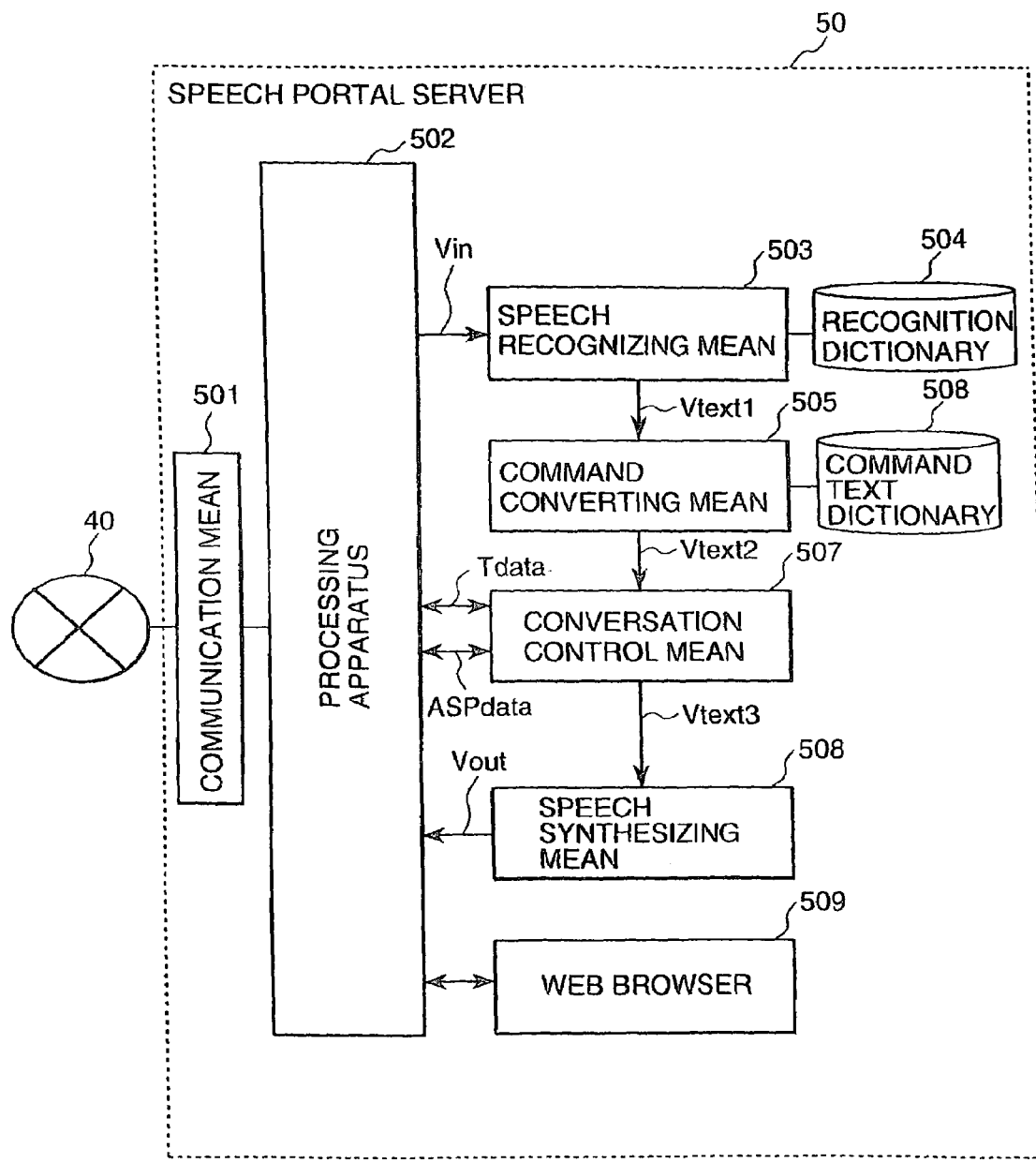
FIG. 8 is a block diagram for showing an embodiment of a speech portal server of the present invention.

FIG. 8 is a block diagram for showing a constitution of an embodiment of a speech portal server 50 of the present invention. The speech portal server 50, which is a characteristic part of the present invention, comprises a communication mean 501 for communicating with the Internet network 40, a processing apparatus 502 for processing the entire speech portal server 50, a speech recognizing mean 503 for receiving speech data Vin, recognizing it with a recognition dictionary 504, and providing text data Vtext1, a command converting mean 505 for using a command text dictionary 506 to convert the recognized speech Vtext1 into a command and an object Vtext2, a conversation control mean 507 for controlling a conversation with the speech input terminal and different information ASP's, a speech synthesizing mean 508 for synthesizing a speech with a speech text Vtext3 from the conversation control mean, and a Web browser 509.

Figure 9:
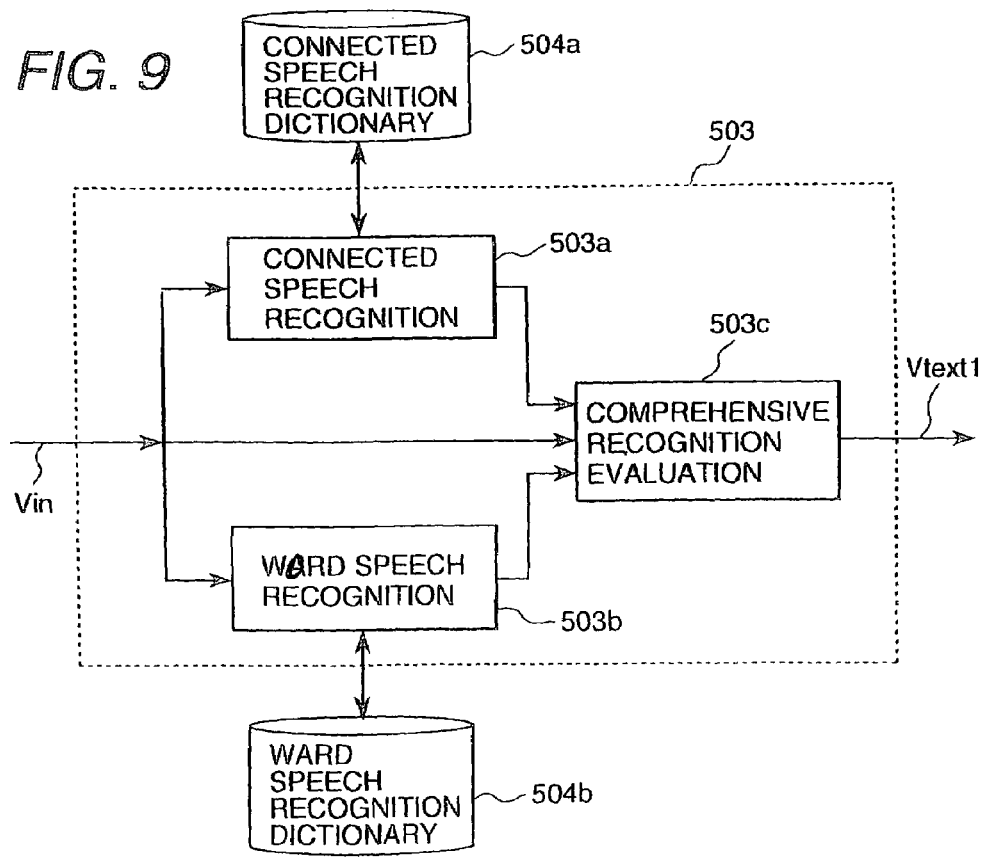
FIG. 9 is a block diagram for showing a constitution of a speech recognizing mean of a speech portal server of the present invention.

FIG. 9 is a block diagram for showing a constitution of the speech recognizing mean 503 of the speech portal server 50 of the present invention. The present embodiment features that the speech recognizing mean is provided with two recognizing engines. Namely, the speech recognizing mean 503 comprises a connected speech recognizing engine 503a for recognizing a relatively long speech, and a word speech recognizing engine 503b for recognizing a relatively short speech such as a command.

The connected speech recognizing engine 503a uses a connected speech recognition dictionary 504a for recognizing a speech, and the work speech recognizing engine 503b uses a word speech recognition dictionary 504b for recognizing a speech.

A comprehensive recognition evaluating mean 503c comprehensively evaluates recognition results of the individual recognizing engines. Generally, the connected speech recognizing engine uses a recognizing method for using a transition probability model between words, and presents an increased number of recognition errors when a short word such as a command is entered since knowledge on the preceding and the following words is not used.

Thus, it is required for the comprehensive recognition evaluating mean to comprehensively determine which output from the recognizing engines is correct.

The following section specifically describes the operation of the comprehensive recognition evaluating mean 503c while using a specific example, and referring to FIG. 10 to FIG. 13.

Figure 10:
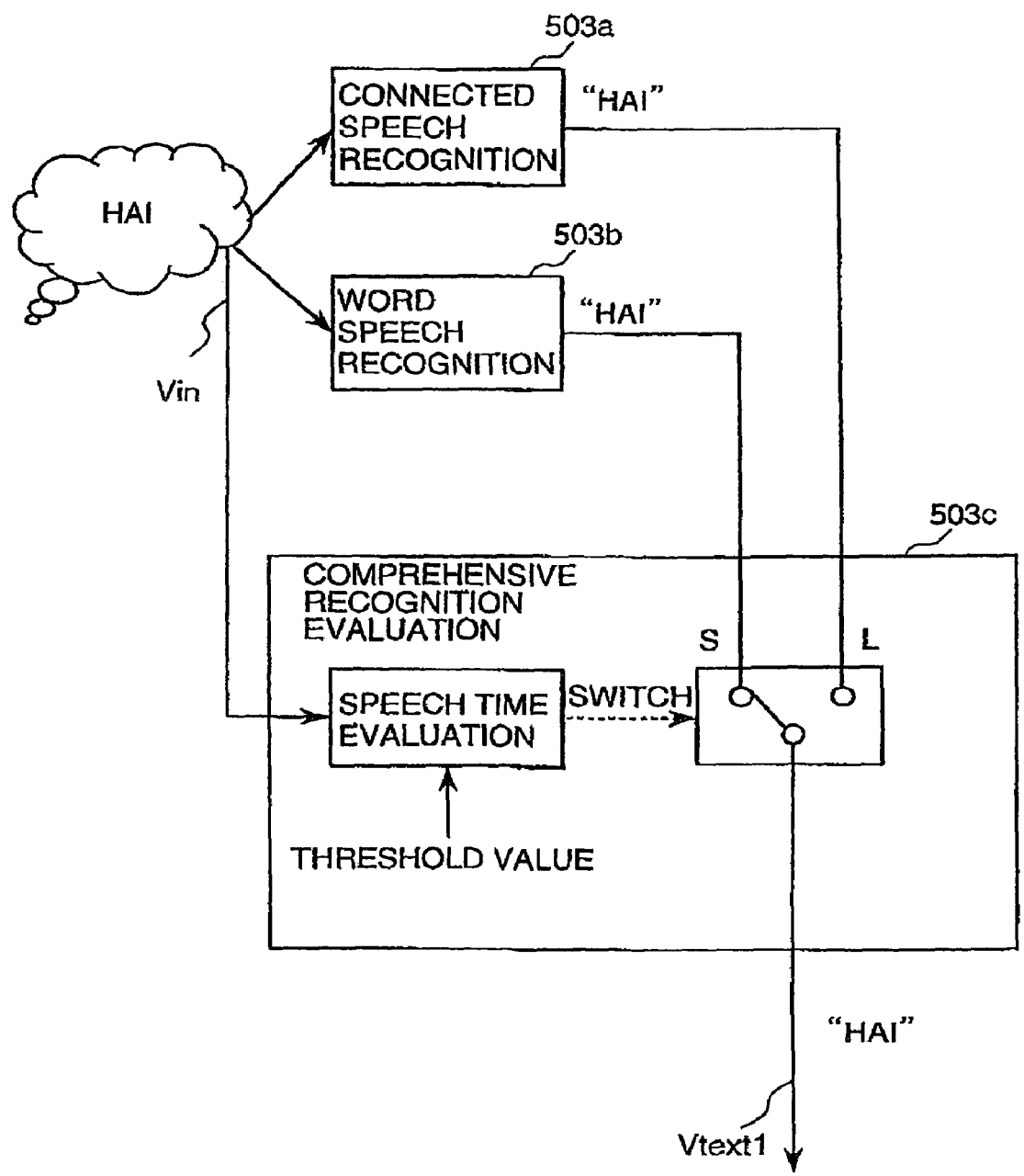
FIG. 10 is a block diagram for showing an operation of a speech recognizing mean of a speech portal server of the present invention.
Figure 11:
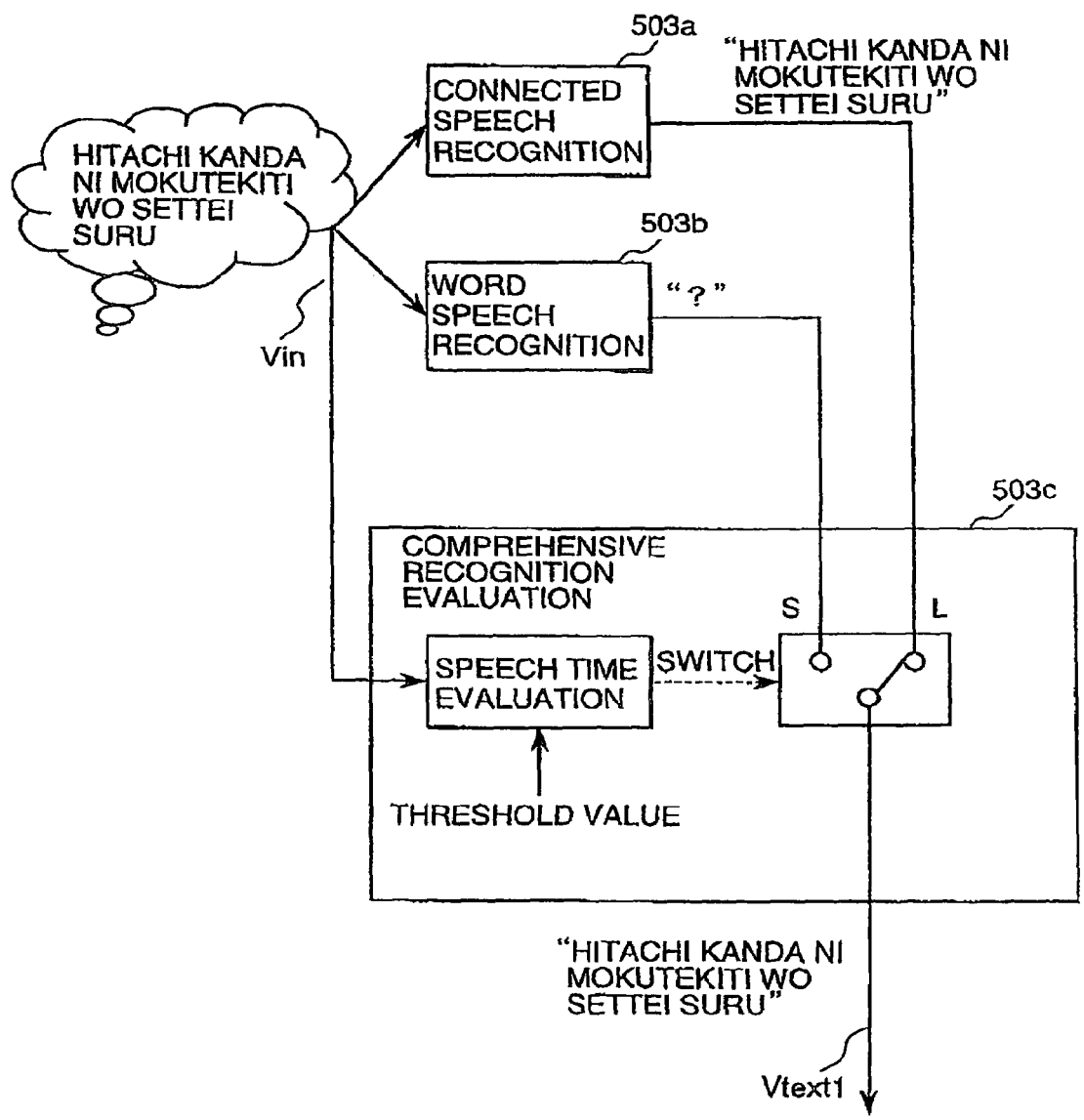
FIG. 11 is a block diagram for showing an operation of a speech recognizing mean of a speech portal server of the present invention.

FIG. 10 to FIG. 11 show examples where a speech time is used to switch the recognition results from the two recognizing engines. The comprehensive recognition evaluating mean 503c compares the speech data Vin with a threshold, and switches to S when Vin short and switches to L when Vin is long in the speech time evaluation.

FIG. 10 is a figure for describing an operation of the speech recognizing mean of the speech portal server 50 of the present invention, and shows a state where a speech "はい。" with a relatively short speech time is entered. In this case, the comprehensive recognition evaluating mean is switched to the S side, and provides an output Vtext1 of a string "はい。". Here, the maximum speech time from the word speech recognition dictionary is selected for the threshold.

FIG. 11 is a figure for describing an operation of the speech recognizing mean of the speech portal server 50 of the present invention, and shows a state where a speech data "日立神田に目的地を設定する。" with a relatively long speech time is entered. In this case, the comprehensive recognition evaluating mean is switched to the L side, and provides an output Vtext1 of a string "日立神田に目的地を設定する。".

Figure 12:
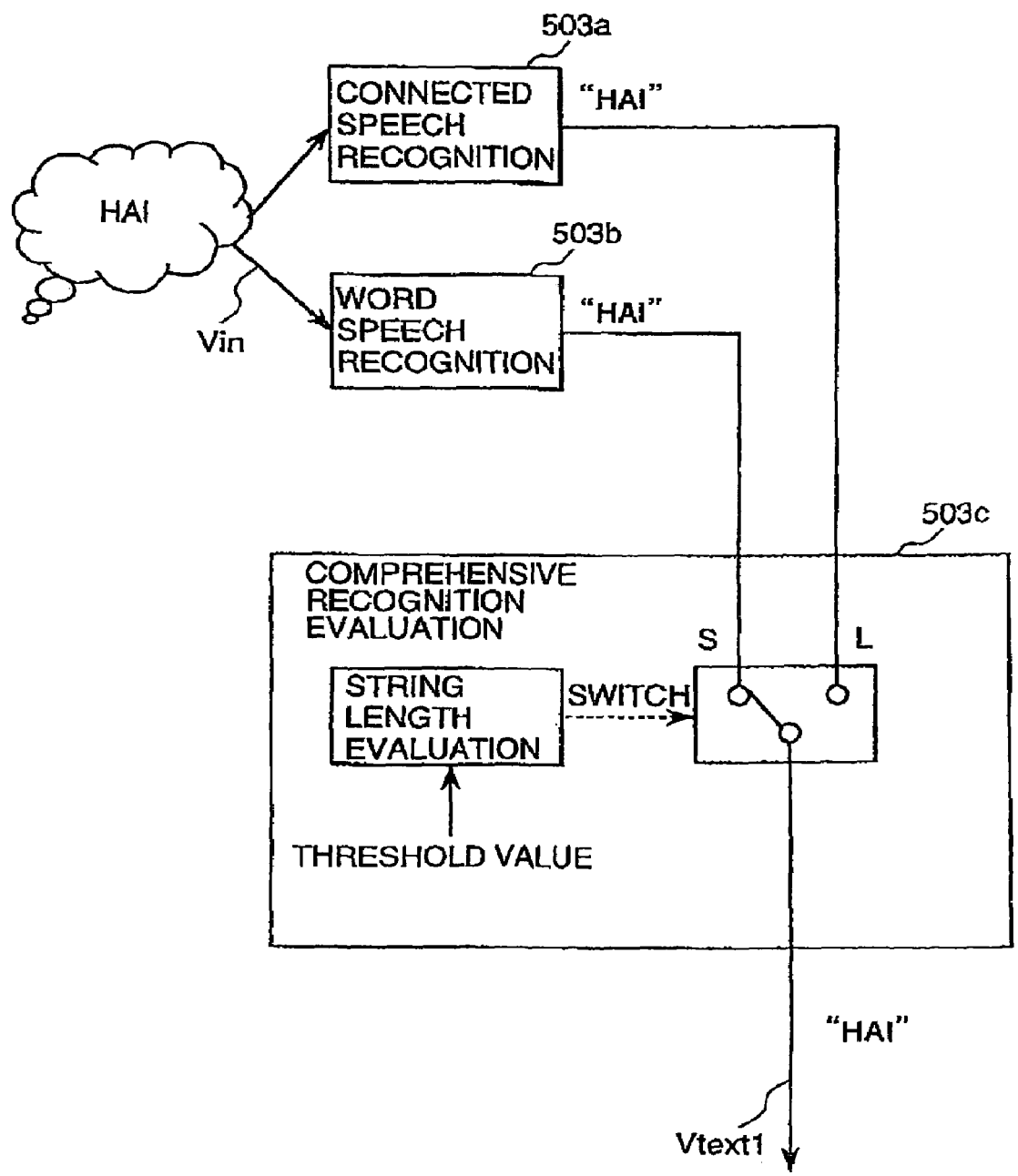
FIG. 12 is a block diagram for showing an operation of a speech recognizing mean of a speech portal server of the present invention.
Figure 13:
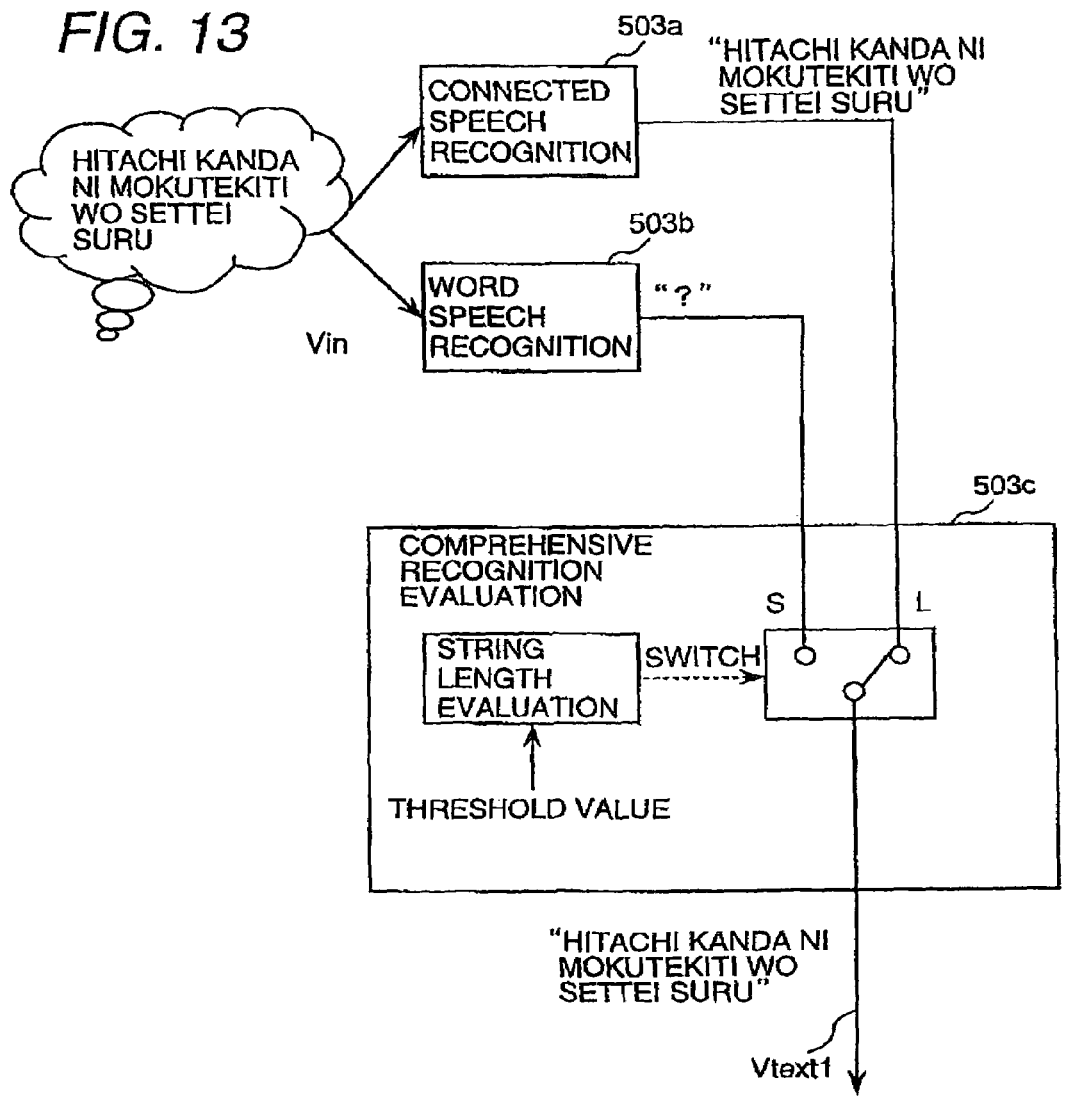
FIG. 13 is a block diagram for showing an operation of a speech recognizing mean of a speech portal server of the present invention.

FIG. 12 to FIG. 13 show examples where a speech time is not evaluated, but the resultant string length from the recognizing engine is compared with a threshold.

FIG. 12 is a figure for describing an operation of the speech recognizing mean of the speech portal server 50 of the present invention, and shows a state where a speech "はい。" with a relatively short speech time is entered. In this case, the comprehensive recognition evaluating mean is switched to the S side, and provides an output Vtext1 of a string "はい。".

FIG. 13 is a figure for describing an operation of the speech recognizing mean of the speech portal server 50 of the present invention, and shows a state where a speech data "立神田に目的地を設定する。" with a relatively long speech time is entered. In this case, the comprehensive recognition evalu-ating mean is switched to the L side, and provides an output Vtext1 of a string "日立神田に目的地を設定する。".

It is set that the engine provides a string "示す文字列=?" for indicating that the recognition is impossible when the recognizing engine receives a speech which is largely different from the dictionary. In this case, when the threshold is selected to a proper value (example: the maximum length of the command strings), an optimal string is provided, thereby improving the overall recognition capability.

As describe in the two types of methods above, when the speech data is a command "はい。", a problem that a string "肺。" is provided when there is only the connected speech recognizing engine is solved.

Figure 14:
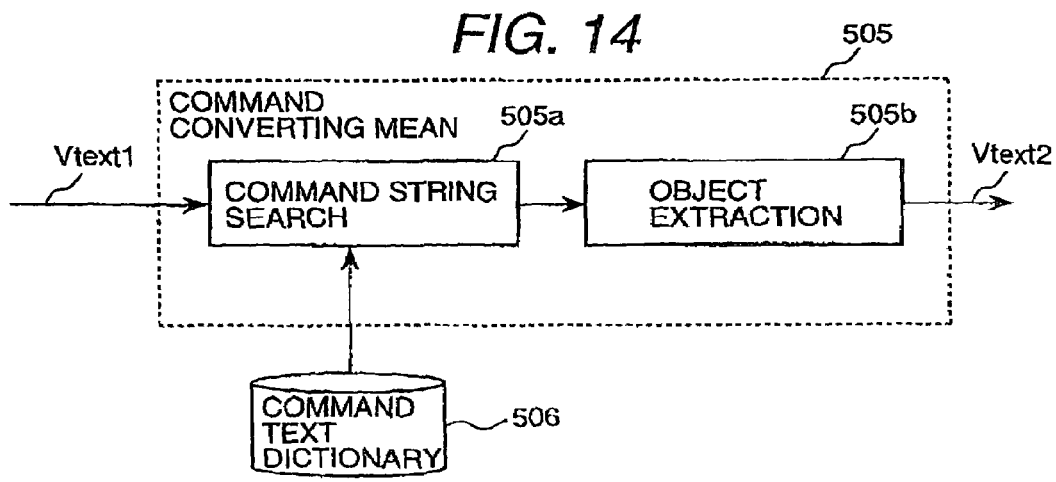
FIG. 14 is a block diagram for showing a constitution of a command converting mean of a speech portal server of the present invention.

FIG. 14 is a block diagram showing a constitution of the command converting mean 505 of the speech portal server 50 of the present invention. When the command converting mean receives a string Vtext1 from the speech recognizing mean 503, a command string search 505a uses the command text dictionary to determine if a command string is included.

FIG. 15 is a figure for showing an example of the speech command text dictionary of the present invention. The command text dictionary 506 includes a command ID and command name 1 to command name 5, and any commands with the same command ID are treated in the same way. A string "目的地設定。" and a string "行く。" are determined as an identical command ID, D01.

Command text strings in FIG. 15 are roughly classified into commands corresponding to the individual information ASP's (NO 1 to NO 8), commands for speech conversation (NO 9 to NO 10), and commands for screen operations (NO 11 to NO 22).

Though command string search assumes a complete match, it may be designed that the search can be conducted for a case where a partial error is included as described later in FIG. 23 to FIG. 24.

Object extraction 505b for extracting a string of an object other than a command is conducted after the command string search 505a. This processing is a processing for extracting a command transmitted to the individual APS's, and an object which is a subject of the search.

Figure 16:
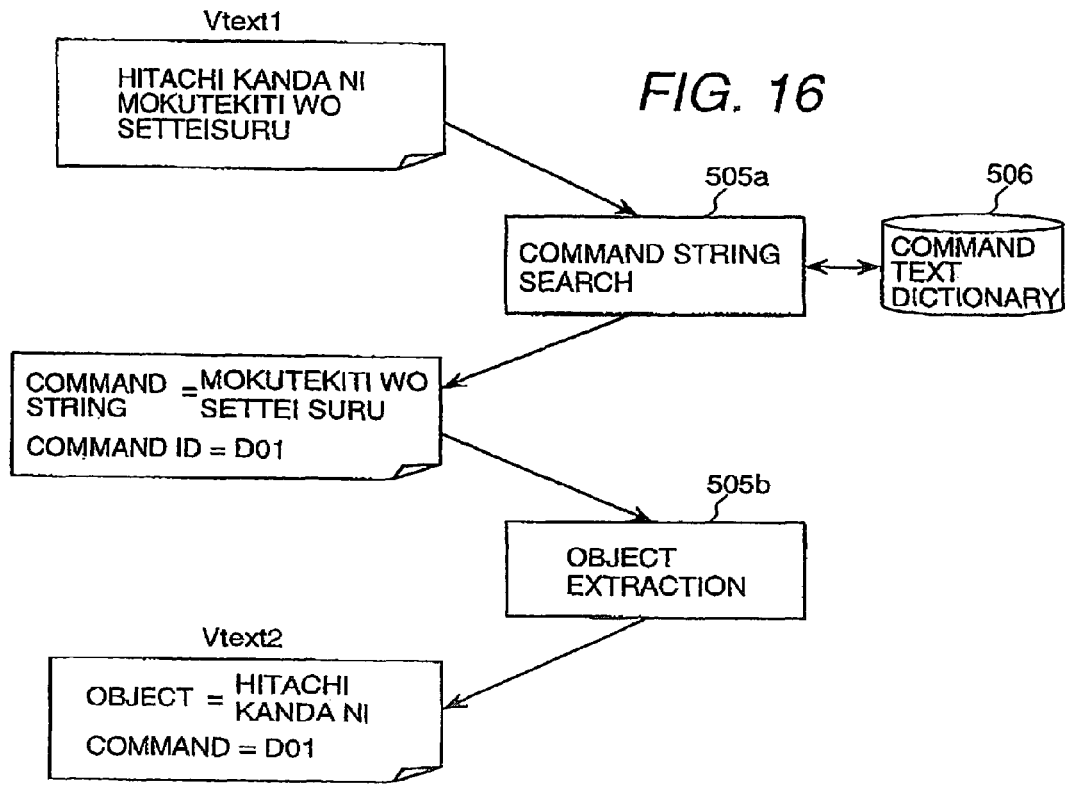
FIG. 16 is a drawing for showing an operation of a command converting mean of a speech portal server of the present invention.

FIG. 16 is a drawing for describing an operation of the command converting mean 505 of the speech portal server 50 of the present invention. When a result Vtext1 of the speech recognizing mean is "日立神田に目的地を設定する。" the command text search 505a refers to the command text dictionary 506, determines that the command string is "目的地を設定する。" and determines that the command ID is D01.

Then the object extraction 505b determines that the part other than the command string is an object, and an object "立神田に。" is extracted. Thus, a result Vtext2 of the object extracting mean 505b is provided as "command ID=D01, Object=日立神田に。".

Though the entire string other than the command characters is assumed as an object in the object extracting mean 505b, it is possible to conduct a morpheme analysis to remove "に" from "日立神田に。" for the extraction.

Figure 17:
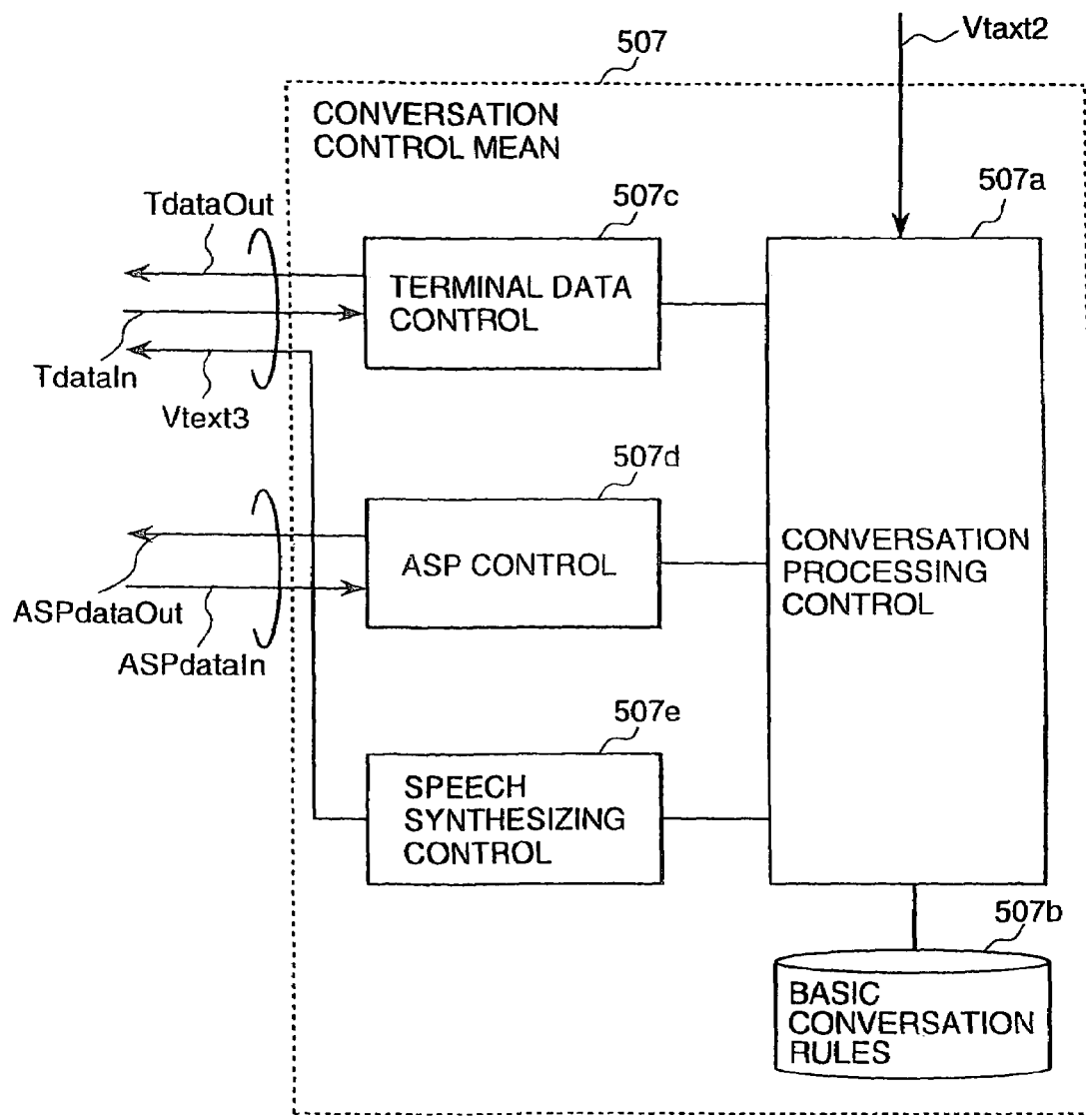
FIG. 17 is a block diagram for showing a constitution of a conversation control mean of a speech portal server of the present invention.

FIG. 17 is a block diagram for showing a constitution of a conversation control mean 507 of the speech portal server 50. The conversation control mean 507 comprises a conversation processing mean 507a for controlling the entire part, basic conversation rules 507b for speech conversation, a terminal data control mean 507c for serving as an interface with the speech input terminal, an ASP control mean 507d for serving as an interface with the individual information ASP's, and a speech synthesizing control mean 507e.

The basic conversation rules 507*b* store rules commonly used among the individual information ASP's, and conversation rules specific to the individual information ASP's are downloaded from the individual information ASP's.

When the conversation processing mean 507*a* receives Vtext2 of output from the speech recognizing mean 505, determines a command ID, determines which information ASP it corresponds to, and transmits the command ID and an object as ASPDataOut to the corresponding information ASP.

When the corresponding ASP provides ASP control mean 507*b* with a search result as ASPDataIn, the terminal control 507*c* provides the speech input terminal which has requested the search with TdataOut. The speech input terminal shown the data of the search result.

When a synthesized speech from the string is provided, the speech synthesizing control mean 507*e* provides a speech sequence as Vtext3, a speech Vout synthesized by the speech synthesizing mean 508 is transmitted to the speech input terminal, and a speaker provides sounds.

When there is a data input other than a speech from the speech input terminal, it is received as TdataIn.

The conversation control mean 507 may be constituted with a Voice XML browser for speech conversation.

The following section describes constitutions of the individual information ASP's while referring to FIG. 18 to FIG. 21.

Figure 18:
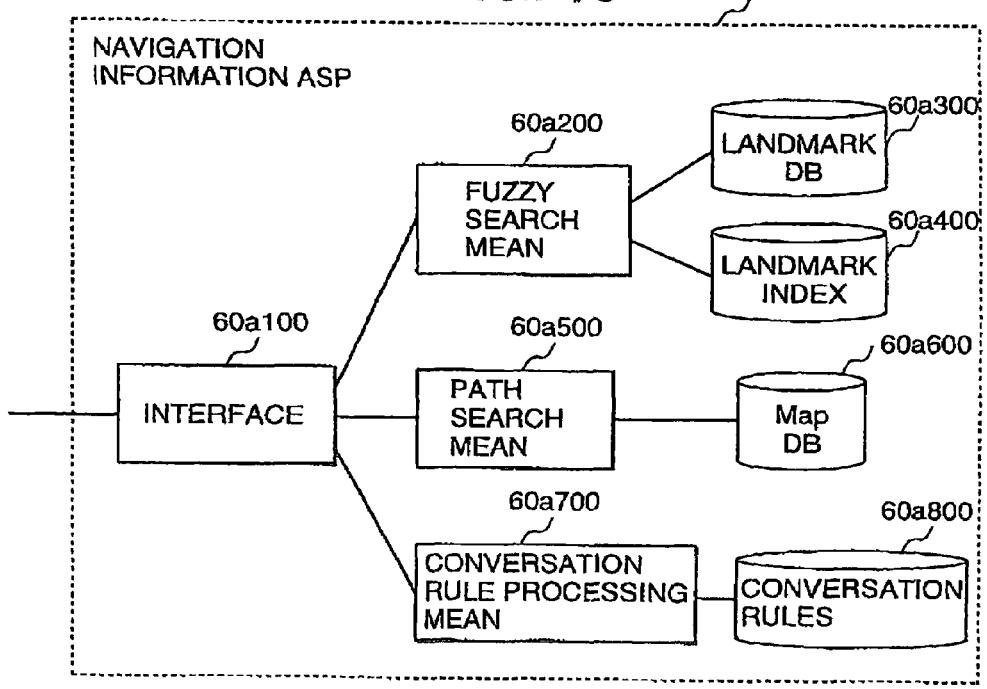
FIG. 18 is a block diagram for showing a constitution of a navigation information ASP of the present invention.

FIG. 18 is a block diagram for showing a constitution of a navigation information ASP of the present invention. The navigation information ASP is a provider serving map information and path search information, and comprises an interface 60*a*100, a fuzzy search mean 60*a*200, a path search mean 60*a*500, and a conversation rule processing mean 600*a*700. The individual means refer to individual dictionaries to process requests.

The fuzzy search mean 60*a*200 refers to a landmark DB 60*a*300, which is a database for landmark information, and a landmark INDEX 60*a*400 dictionary for the fuzzy search. The detailed operation is described later.

The path search mean 60*a*500 refers to Map DB 60*a*600 which are map data, and searches a path from a current position to a destination. This path search is a general path search processing, and the detailed description is skipped.

The conversation rule processing mean 60*a*700 is a mean for processing conversation rules specific to the individual information ASP's, and the conversation rules 60*b*800 are used as rules other than base conversation rules for the speech portal server 50.

Figure 19:
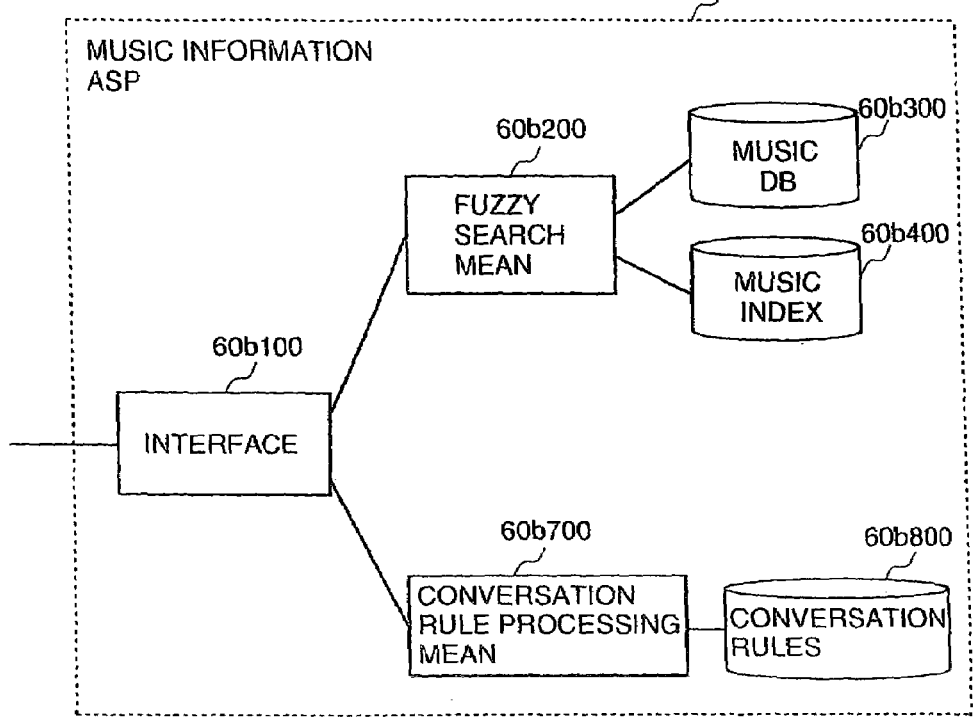
FIG. 19 is a block diagram for showing a constitution of a music information ASP of the present invention.

FIG. 19 is a block diagram for showing a constitution of a music information ASP of the present invention. Compared with the ASP in FIG. 18, the music information ASP does not include what corresponds to the path search mean, and its contents are a music DB 60*b*300, a music INDEX 60*b*400, and conversation rules for music 60*b*800.

Figure 20:
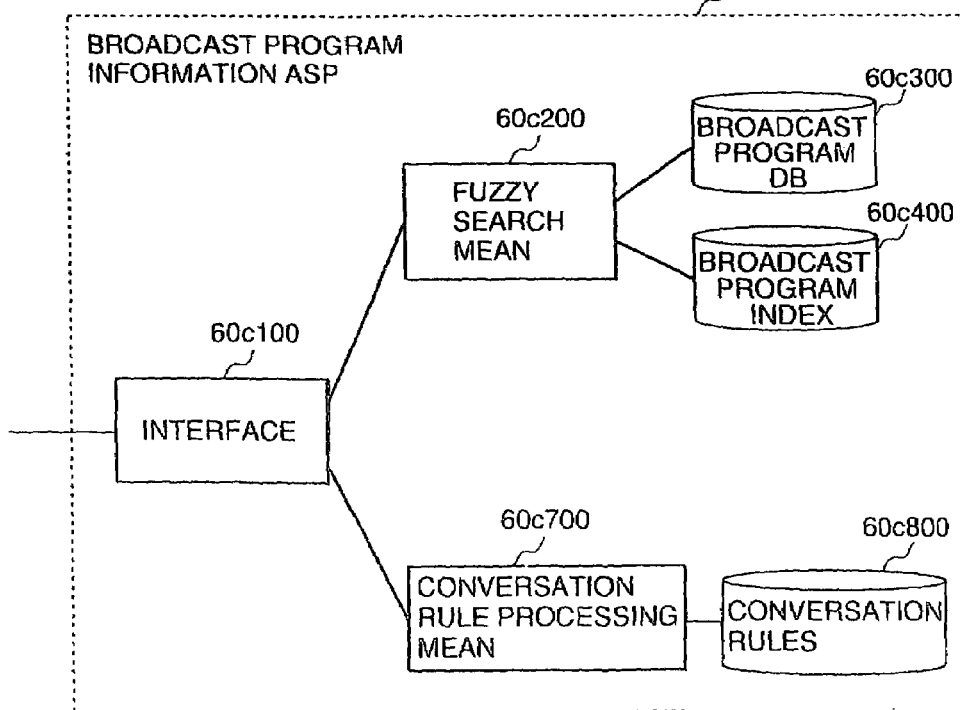
FIG. 20 is a block diagram for showing a constitution of a TV broadcast program information ASP of the present invention.

FIG. 20 is a block diagram showing a constitution of a TV broadcast program information ASP of the present invention. It differs from the ASP in FIG. 19 in contents. Its contents include a TV broadcast program DB 60*c*300, a broadcast program INDEX 60*c*300, a broadcast program INDEX 60*c*400 and rules for broadcast programs 60*c*800.

The TV broadcast programs mean at least one type of information of information on TV broadcast programs, information on CS broadcast programs, and information of CATV broadcast programs in this specification.

Figure 21:
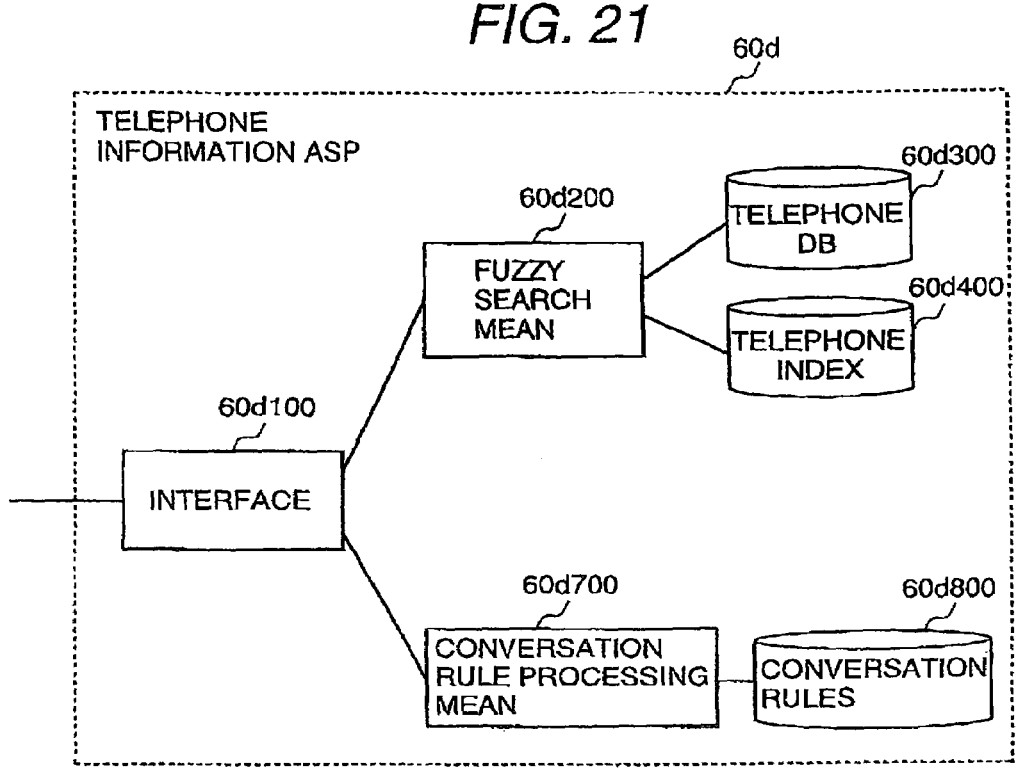
FIG. 21 is a block diagram for showing a constitution of a telephone information ASP of the present invention.

FIG. 21 is a block diagram for showing a constitution of a telephone information ASP of the present invention. It has contents different from those for the ASP in FIG. 19, and is provided with a telephone DB 60*d*300, a telephone INDEX 60*d*400, and conversation rules for telephone 60*d*800.

Figure 22:
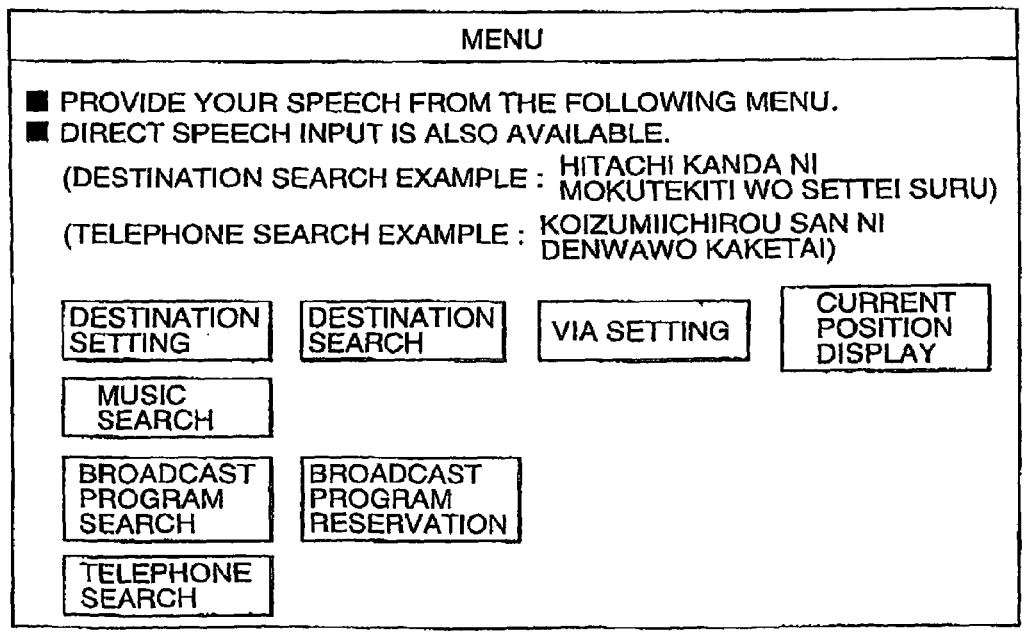
FIG. 22 is a drawing for showing an example of a speech operation menu screen of the present invention.

FIG. 22 shows an example for a speech operation menu screen of the present invention. The speech menu is provided with speech menu icons according to the individual information ASP's. The icons relating to the navigation information ASP includes "目的地設定。", "目的地検索。", "経由地設定。", and "在地表示。".

The icons relating to the music information ASP includes "楽検索。". The icons relating to the broadcast program ASP includes "番組検索。", "番組予約。". The icons relating to the telephone information ASP includes "電話検索。".

The present invention allows a method for entering an item from the speech menu and a method for entering everything including an object. For example, it is possible to enter a speech of "日立神田に。地を設定する。" for a destination search without pressing the menu.

Figure 23:
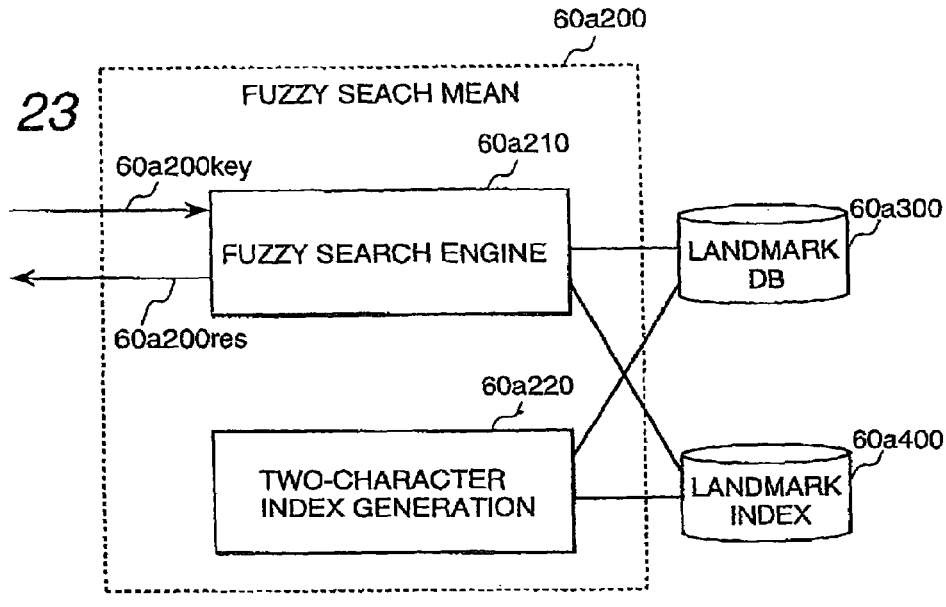
FIG. 23 is a block diagram for showing a constitution of a fuzzy search mean of individual information ASP's of the present invention.

FIG. 23 is a block diagram for showing a constitution of the fuzzy search mean 60*a*200 for the individual information ASP's of the present invention. The other fuzzy search means 60*b*200, 60*c*200, and 60*d*200 have a constitution same as that of the fuzzy search mean 60*a* 200.

The fuzzy search mean 60*a*200 comprises a search engine 60*a*100 and two-character INDEX generation 60*a*220 in FIG. 23. The search engine 60*a*100 and the two-character INDEX generation 60*a*220 search while referring to the landmark DB 60*a*300, and the landmark INDEX 60*a*400.

Since the landmark DB stores large amount of data up to several million of items, it is required that the landmark DB has generated the two-character INDEX before hand. The present invention features a fast and fuzzy search with this two-character INDEX generation processing. The fuzzy search here does not mean that meaning is fuzzy but that entered words are searched when there is a partial error in a string (a partially added string, a partially missing string, a random string order, and a partial error string).

Figure 24:
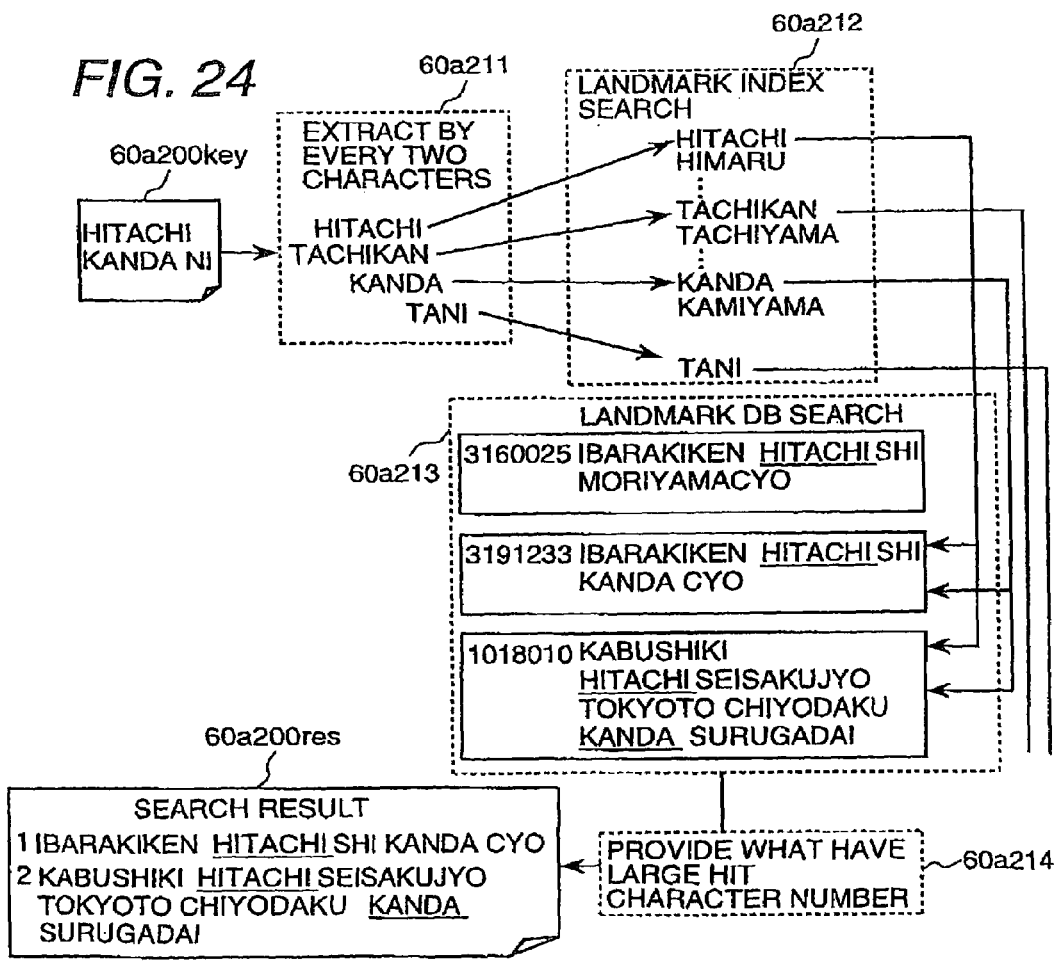
FIG. 24 is a drawing for showing an example of a procedure for a fuzzy search mean of individual information ASP's of the present invention.

FIG. 24 shows an example of the fuzzy search for the individual information ASP's of the present invention. This example sets a destination to "日立神田に。".

First, a search key word 60*a*300 key of "日立神田に。" is entered, a processing for extracting every two characters 60*a*211 is conducted.

Then, a landmark INDEX search 60*a*212 is conducted for the every two characters.

The landmark INDEX search 20*a*212 searches the landmark DB, and extracts hit DB records.

The extracted records are sorted in the order of the number of hit characters, and an output processing 60*a*214 is conducted, and a list 60*a*200*res* is provided as a search result.

Since the INDEX search by every two characters is conducted as described above, it has characteristics of the fast search and the fuzzy search.

When "に。" of "日立神田に。" is included in a search object, if the landmark DB does not has a correspondence, it ignores it. On the other hand, even if "日立神田に。" is entered, what relating to it hit.

Thus, it has an effect that a name of a place or a landmark which occurs to mind can be entered.

It is also possible to design such that multiple search results are shown on the speech input terminal, and a speech instruction prompts for selecting the search subjects.

Though the present embodiment uses two-character INDEX generation processing for the search as shown in FIG. 23 to FIG. 24, a three-character INDEX, or a four-character INDEX is also applicable.

When information includes many numbers and alphabets, the three-character INDEX generation or the four-character INDEX generation presents less unnecessary search output compared with the two-character INDEX processing.

The following section describes specific communication procedures among the speech input terminal, the speech portal server 50, and the information ASP 60 while referring to FIG. 25 to FIG. 28.

Figure 25:
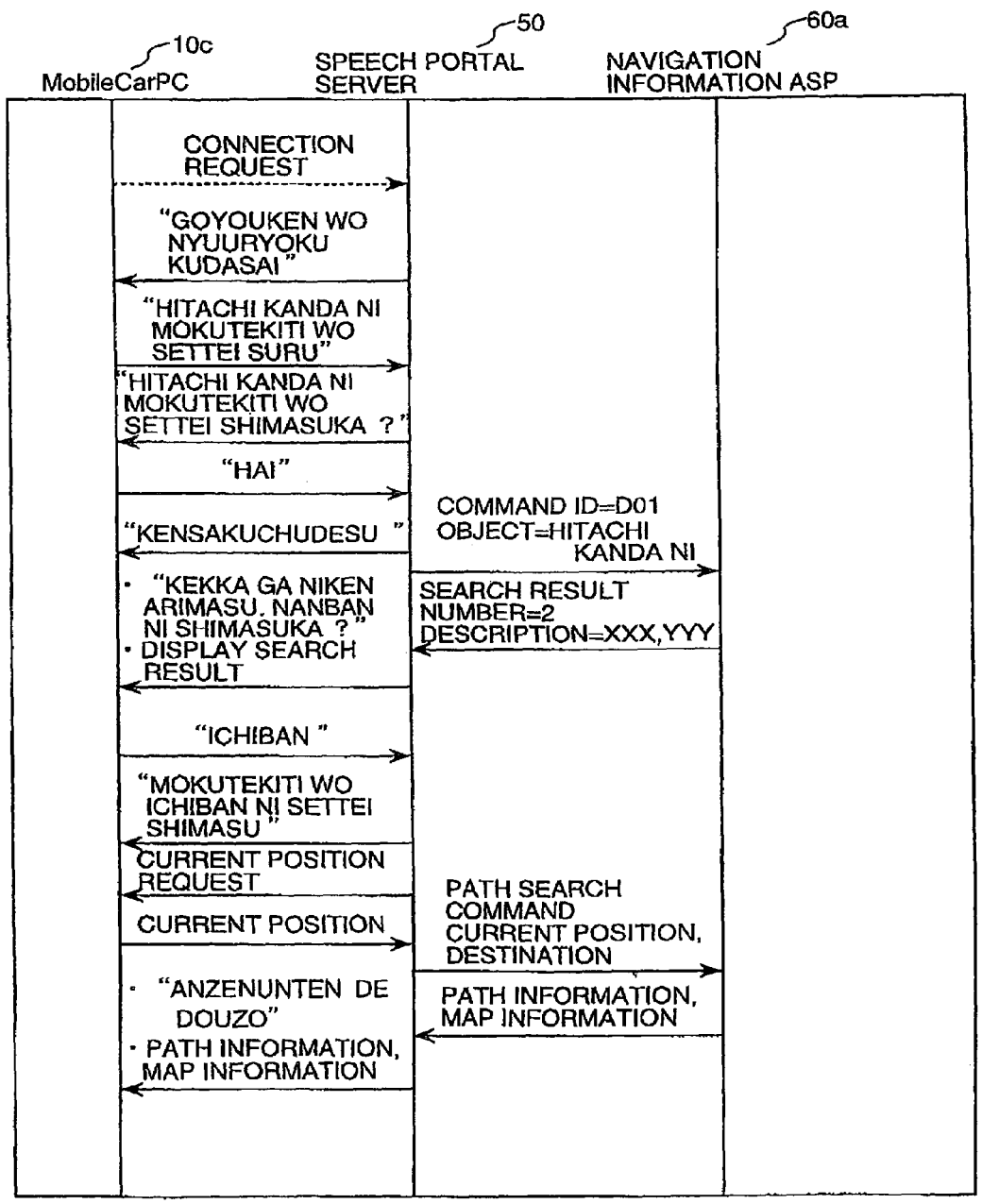
FIG. 25 is a drawing for showing a communication procedure among a speech input terminal, a speech portal server and a navigation information ASP of the present invention.

FIG. 25 shows a communication procedure among the speech input terminal, the speech portal server, and the navigation information ASP of the present invention. Here, the communication procedure among the speech input terminal Mobile PC 10c, the speech portal server 50, and the navigation information ASP 60a, and a communication procedure with another information ASP is almost similar.

First, when the speech input terminal Mobile PC 10c sends a connection request to the speech portal server 50, the speech portal server 50 provides the speech input terminal Mobile PC 10c with a speech output of "ご用件を入力ください。" through speech. Simultaneously, the speech menu in FIG. 21 is shown.

Then, the speech input terminal Mobile PC 10c conducts a direct speech input of "日立神田に目的地を設定する。" through speech.

The speech portal server 50 recognizes it, and responds to it as "日立神田に目的地を設定しますか" through speech.

Then, a speech for a command of "はい。" or "いいえ。" is entered.

When "はい。" is entered, the speech portal server 50 returns a speech response of "検索中です。" to the speech input terminal Mobile PC 10c, sends data comprising a command ID "D01" and an object "日立神田に。" to the navigation information ASP 60a, and receives a search result. Here, a search result (two hits), and a content (XXX, YYY) are returned.

The speech portal server 50 responds through speech as "果が2件あります。何番にしますか" according to the search result. Simultaneously the display of the speech input terminal Mobile PC 10c shows the content of the search result.

Then, an speech instruction "1番。" is entered through speech, the speech portal server 50 recognizes the speech, and provides a corresponding speech output of "目的地を1番に設定します。".

Further, it request the speech input terminal Mobile PC 10c for a current position, obtains current position information, and sends a path search command and its parameters to the navigation information ASP 60a based on this information.

The speech portal server 50 receives path information and map information as the search result from the navigation ASP, and provides the speech input terminal Mobile PC 10c with it, and responds as "安全運転でどうぞ。" through speech.

When "いいえ。" is entered in the communication procedure described above, the procedure returns to "ご用件を入力くださ" again, which is suppressed from the drawing.

When a selection is made from multiple search results, though an example for selecting through speech is presented, a touch panel is provided, and the touch panel is used for the selection. If this is the case, a correspondence between the content of the search and the coordinate of the touch panel must be determined before hand.

Though the Mobile PC 10c is used as the speech input terminal, the PDA 10a, and the mobile TEL 10b can communicate with the navigation information ASP in FIG. 25. In this case, the navigation system is a human. Since the current position of the own speech input terminal is known, it is possible to shown the current position information and search for a destination landmark.

Figure 26:
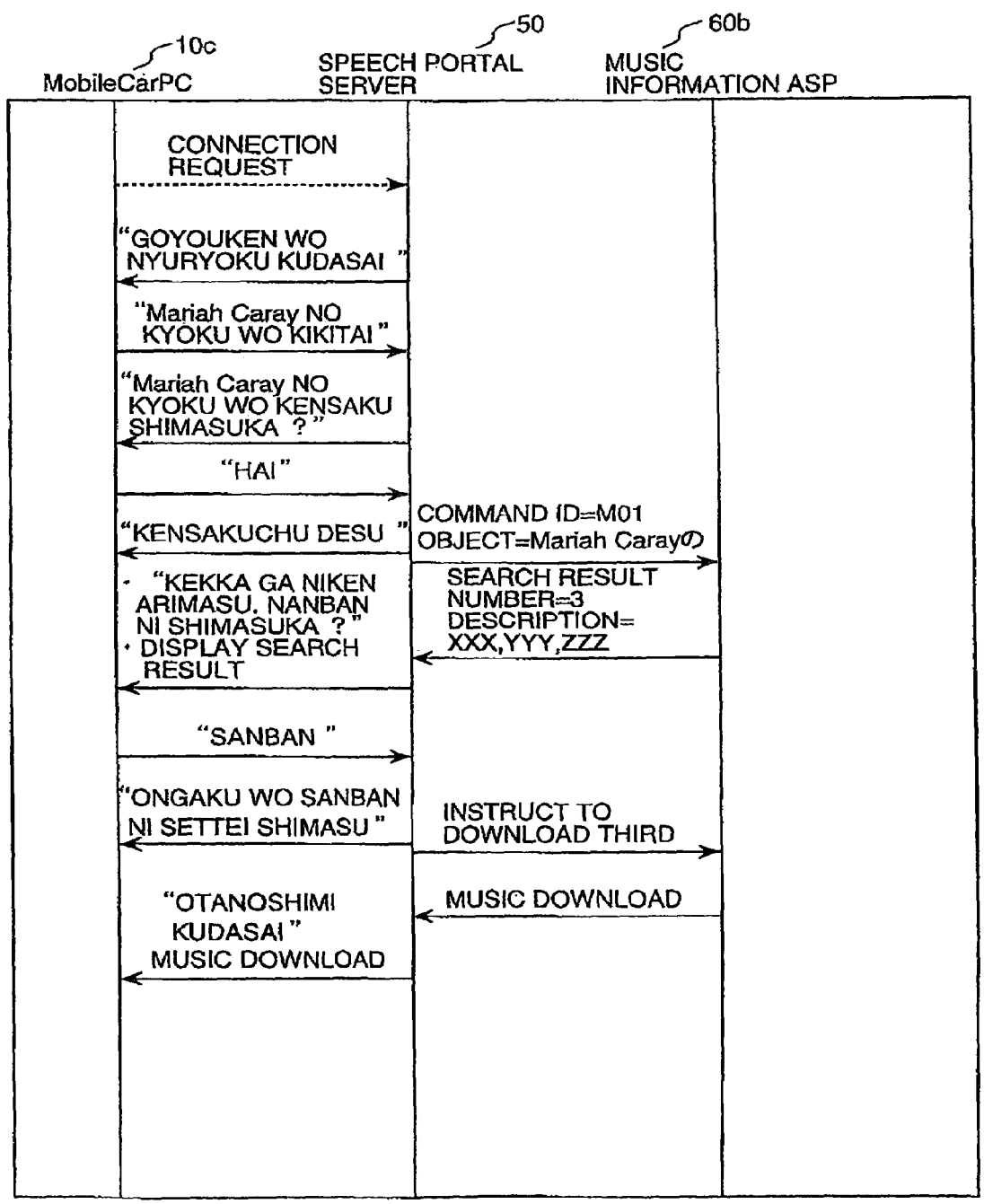
FIG. 26 is a drawing for showing a communication procedure among a speech input terminal, a speech portal server and a music information ASP of the present invention.

FIG. 26 is a drawing for showing a communication procedure among the speech input terminal, the speech portal server, and the music information ASP. This is a communication procedure where a speech input Mobile PC 10c receives a music content service from the music information ASP 60b through the speech portal server 50.

First, when the speech input terminal Mobile PC 10c sends a connection request to the speech portal server 50, the speech portal server 50 provides the speech input terminal Mobile PC 10c with a speech output of "ご用件を入力ください。" through speech. Simultaneously, the speech menu in FIG. 21 is shown.

Then, the speech input terminal Mobile PC 10c conducts a direct speech input of "Mariah Carey の曲を聴きたい。" through speech.

The speech portal server 50 recognizes it, and responds to it as "Mariah Carey の曲を検索しますか?" through speech.

Then, a speech for a command of "はい。" or "いいえ。" is entered.

When "はい。" is entered, the speech portal server 50 returns a speech response of "検索中です。" to the speech input terminal Mobile PC 10c, sends data comprising a command ID "M01" and an object "Mariah Carey の。" to the music information ASP 60b, and receives a search result.

Here, a search result (three hits), and a content (XXX, YYY, ZZZ) are returned.

The speech portal server 50 responds through speech as "果が3件あります。何番にしますか" according to the search result. Simultaneously the display of the speech input terminal Mobile PC 10c shows the content of the search result.

Then, an speech instruction "3番。" is entered through speech, the speech portal server 50 recognizes the speech, and provides a corresponding speech output of "音楽を3番に設定します". Simultaneously, the music information ASP is instructed to download the third music tune.

With this, a speech response of "お楽しみください。" and a corresponding music content are downloaded to the speech input terminal Mobile PC 10c.

When a search result includes only one item, after receiving a response of whether OK or not, a download starts.

Figure 27:
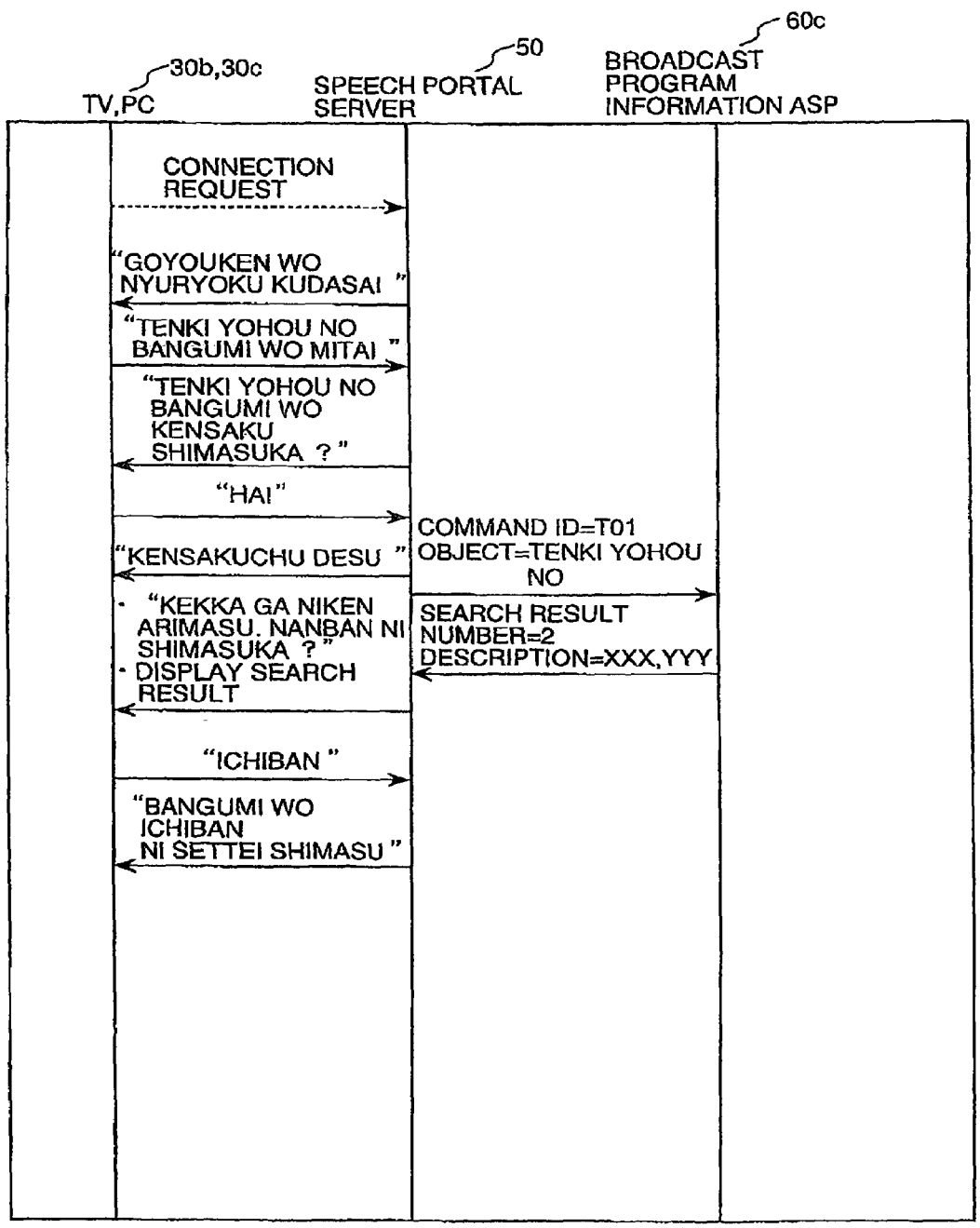
FIG. 27 is a drawing for showing a communication procedure among a speech input terminal, a speech portal server and a TV broadcast program information ASP of the present invention.

FIG. 27 shows a communication procedure among the speech input terminal, the speech portal server, and the TV broadcast program information ASP of the present invention. This is a communication procedure where a speech input terminal TV 30b and a PC 30C receive a TV broadcast program content service from the broadcast program information ASP 60c through the speech portal server 50.

First, when the speech input terminal sends a connection request to the speech portal server 50, the speech portal server 50 provides the speech input terminal with a speech output of "ご用件を入力ください。" through speech. Simultaneously, the speech menu in FIG. 21 is shown.

Then, the speech input terminal conducts a direct speech input of "天気予報の番組を見たい。" through speech.

The speech portal server 50 recognizes it, and responds to it as "天気予報の番組を検索しますか" through speech.

Then, a speech for a command of "はい。" or "いいえ。" is entered.

When "はい。" is entered, the speech portal server 50 returns a speech response of "検索中です。" to the speech input terminal, sends data comprising a command ID "T01" and an object "気予報の。" to the broadcast program information ASP 60c, and receives a search result.

Here, a search result (two hits), and a content (XXX, YYY) are returned.

The speech portal server 50 responds through speech as "果が2件あります。何番にしますか" according to the search result. Simultaneously the display of the speech input terminal shows the content of the search result.

Then, an speech instruction "1番。" is entered through speech, the speech portal server 50 recognizes the speech, and provides a corresponding speech output of "番組を1番に設定します。".

As the result, a channel corresponding to the TV broadcast program is set, thereby allowing viewing a weather forecast service.

When a search result includes only one item, after receiving a response of whether OK or not, a channel is set.

When a weather forecast service is not being broadcasted, a channel can be programmed. In this case, the speech portal server 50 provides a guidance asking if programming is conducted or not, and the programming ends when it is responded.

For TV broadcast programs viewed every week, programming for every week is available.

Figure 28:
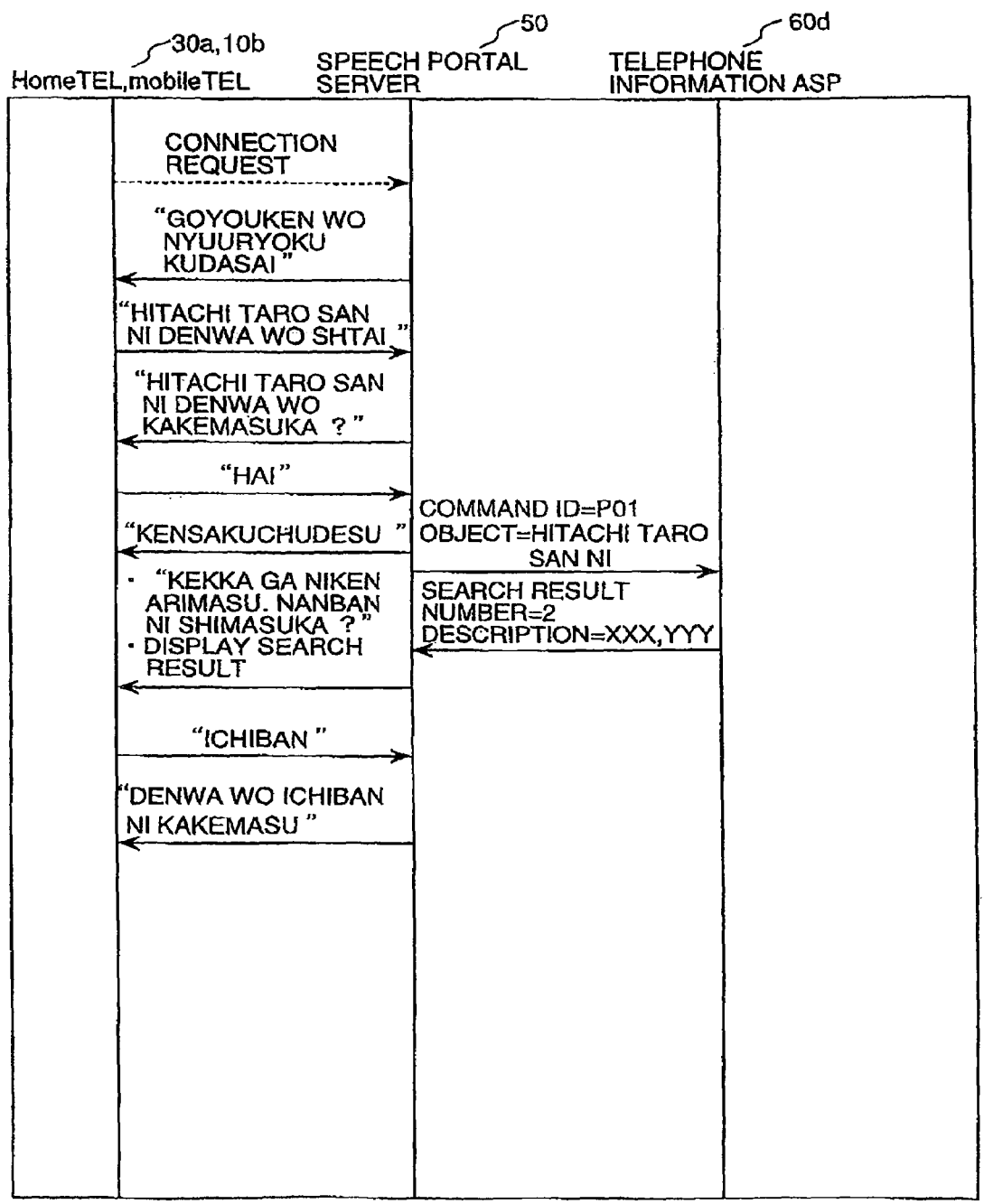
FIG. 28 is a drawing for showing a communication procedure among a speech input terminal, a speech portal server and a telephone information ASP of the present invention.

FIG. 28 shows a communication procedure among the speech input terminal, the speech portal server, and the telephone information ASP of the present invention. This is a communication procedure where a speech input terminal home telephone 30a and a Mobile TEL 10b receive a telephone information content service from the telephone information ASP 60d through the speech portal server 50.

First, when the speech input terminal sends a connection request to the speech portal server 50, the speech portal server 50 provides the speech input terminal with a speech output of "ご用件を入力ください。" through speech. Simultaneously, the speech menu in FIG. 21 is shown.

Then, the speech input terminal conducts a direct speech input of "日立太郎さんに電話したい。" through speech.

The speech portal server 50 recognizes it, and responds to it as "日立太郎さん電話をかけますか" through speech.

Then, a speech for a command of "はい。" or "いいえ。" is entered.

When "はい。" is entered, the speech portal server 50 returns a speech response of "検索中です。" to the speech input terminal, sends data comprising a command ID "P01" and an object "立太郎さんに。" to the telephone information ASP 60d, and receives a search result.

Here, a search result (two hits), and a content (XXX, YYY) are returned.

The speech portal server 50 responds through speech as "果が2件あります。何番にしますか?" according to the search result. Simultaneously the display of the speech input terminal shows the content of the search result.

Then, an speech instruction "1番。" is entered through speech, the speech portal server 50 recognizes the speech, and provides a corresponding speech output of "電話を1番にかけます。".

Specifically, when a search result includes only one item, after receiving a response of whether OK or not, a telephone call is conducted.

With the present invention, a speech portal server recognizes a speech entered from a speech input terminal, the speech is separated into a command text and an object text, information stored in an application service provider is searched with fuzziness based on the separated texts, and an intended information is provided for the speech input terminal even if there is a partial error in the object text.

Also, since a speech recognizing engine of the speech portal server is constituted such that it comprises two speech recognizing engines of a connected speech recognizing engine suitable for a long sentence, and a word speech recognizing engine for a short sentence such as a command for comprehensive evaluation, the recognition capability for speech conversation increases.

Further, since a navigation information ASP, a music information ASP, a broadcast program information ASP, and a telephone information ASP are provided as application service providers (ASP's), mobile speech input terminals such as a PDA, a Mobile TEL, and a Mobile Car PC, and home speech input terminals such as a home telephone, a TV set, and a PC can receive optimal information according to their individual requirement.

What is claimed is:

1. A speech input system comprising:
   a speech input terminal provided with a speech input/output mean, a Web browser, and a display mean for displaying an access status to an external system and a search result;
   a speech portal server provided with a speech recognizing mean for receiving a speech from said speech input terminal to recognize it as a text, a command converting mean for checking the recognized text with a command text dictionary, and separating it into a command text and an object text, and a conversation control mean; and
   an application service provider which is provided with an information search mean for searching information based on the command text and the object text received from said speech portal server through a communication means, and serves said speech portal server with a search result;
   wherein said information search mean of the application service provider extracts every (n) characters from the received object text, and searches for information based on n-character INDEX created beforehand.

2. The speech input system according to claim 1, wherein said application service provider is a navigation information application service provider which serves map information.

3. The speech input system according to claim 2, wherein said application service provider is a music information application service provider which serves music information.

4. The speech input system according to claim 3, wherein said application service provider is a broadcast program information application service provider which serves information on at least one of a TV broadcast program, a CS broadcast program, and a CATV broadcast program.

5. The speech input system according to claim 4, wherein said application service provider is a telephone information application service provider which serves telephone information.

* * * * *